(12) United States Patent
Numakami

(10) Patent No.: US 9,596,326 B2
(45) Date of Patent: Mar. 14, 2017

(54) COMMUNICATION APPARATUS, COMMUNICATION METHOD, AND NON-TRANSITORY COMPUTER-READABLE MEDIUM

(71) Applicant: CANON KABUSHIKI KAISHA, Tokyo (JP)

(72) Inventor: Yukio Numakami, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 68 days.

(21) Appl. No.: 14/790,138

(22) Filed: Jul. 2, 2015

(65) Prior Publication Data

US 2016/0014242 A1    Jan. 14, 2016

(30) Foreign Application Priority Data

Jul. 10, 2014 (JP) ................. 2014-142637

(51) Int. Cl.
*H04L 29/06* (2006.01)
*H04L 12/26* (2006.01)

(52) U.S. Cl.
CPC ............ *H04L 69/22* (2013.01); *H04L 43/067* (2013.01); *H04L 63/08* (2013.01); *H04L 63/168* (2013.01)

(58) Field of Classification Search
CPC .............................. H04L 69/22; H04L 43/067
See application file for complete search history.

(56) References Cited

U.S. PATENT DOCUMENTS

2005/0027731 A1* 2/2005 Revel ...................... H04L 69/04
2012/0257630 A1* 10/2012 Burns ...................... H04L 45/38
                                                                                370/393

(Continued)

OTHER PUBLICATIONS

M. Balshe and three others "Hypertext Transfer Protocol version 2", [online], Apr. 23, 2014, Internet <URL: http://www.ietf.org/id/draft-ietf-httpbis-http2-03.txt> , pp. [1] to [48].

(Continued)

*Primary Examiner* — Mohamed Kamara
*Assistant Examiner* — Thad Defauw
(74) *Attorney, Agent, or Firm* — Fitzpatrick, Cella, Harper & Scinto

(57) ABSTRACT

A first header compression table for compressing a message header is generated based on a first communication connection established between communication apparatuses. A message is transmitted from a communication apparatus to another communication apparatus based on the first communication connection, and a header of the message has been compressed based on the first header compression table. It is determined whether the first header compression table is used as a second header compression table for compressing a message header to be communicated based on a second communication connection which is different from the first communication connection and has been established between the communication apparatuses. The header of the message to be communicated based on the second communication connection is compressed using the first header compression table as the second header compression table in accordance with the determination.

16 Claims, 25 Drawing Sheets

(56) References Cited

U.S. PATENT DOCUMENTS

2013/0114626 A1* 5/2013 Bellessort ............... H04L 69/04
370/477
2015/0271739 A1 9/2015 Numakami ........... H04W 48/02

OTHER PUBLICATIONS

R. Peon and H. Ruellan, "HTTP Header Compression for HTTP/2", [online], Apr. 3, 2014, Internet <URL:http://www.ietf.org/id/draft-ietf-httpbis-header-compression-00.txt>, pp. [1] to [17].

* cited by examiner

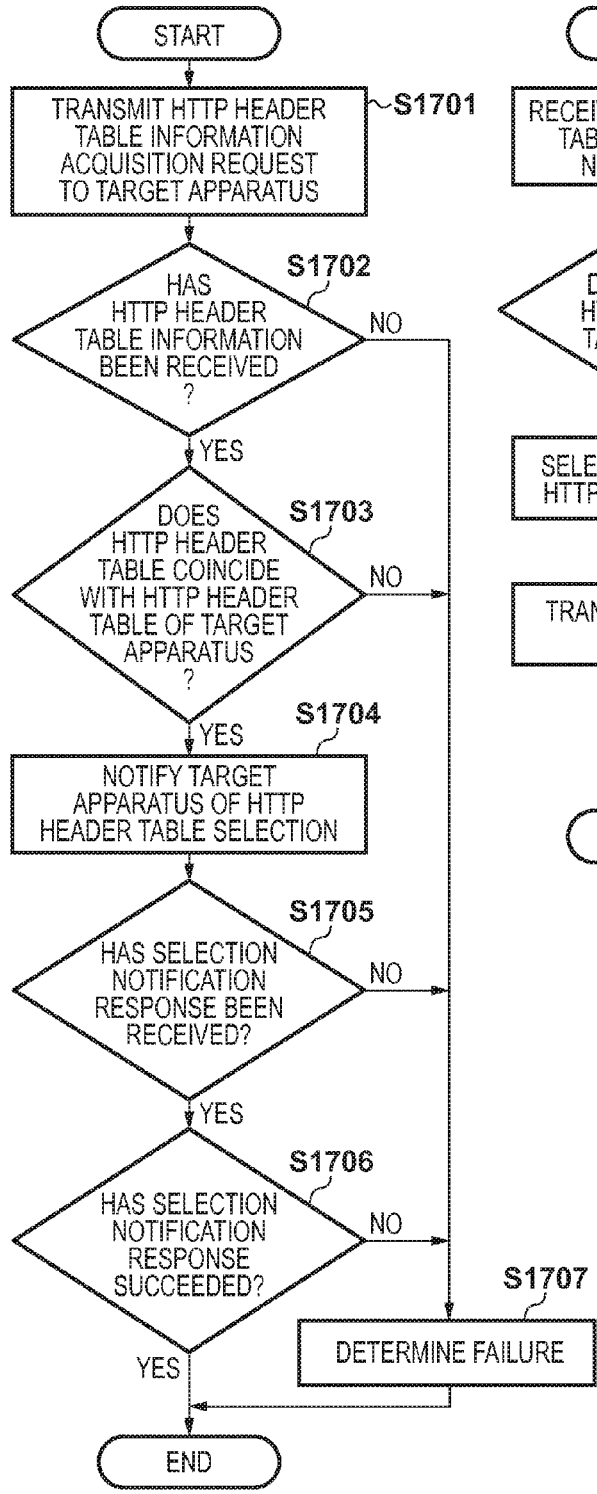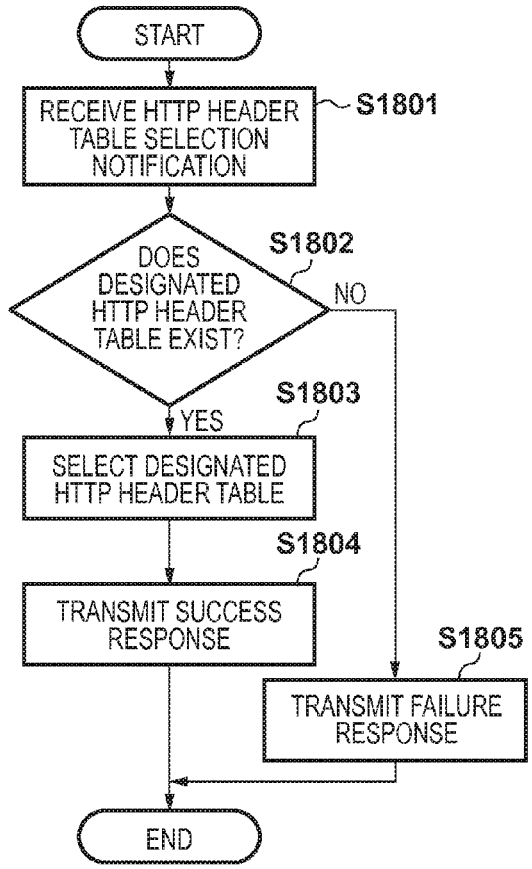

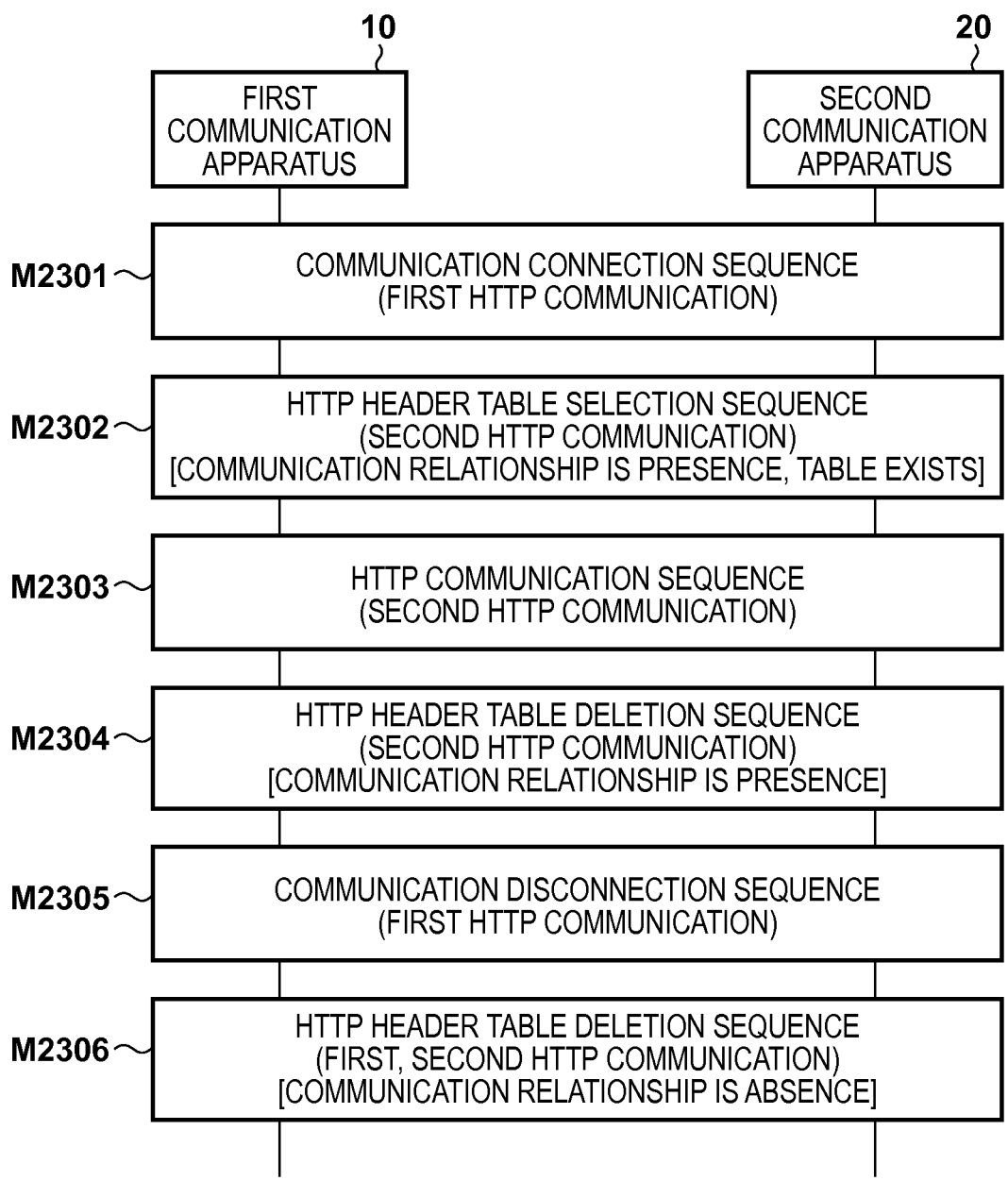

FIG. 24A

HTTP REQUEST HEADER TABLE — 3400

| Index | Header Name | Header Value | — 3410 |
|---|---|---|---|
| 0 | :scheme | http | |
| ... | ... | ... | |
| 37 | warning | | |

3411　　3412　　3413

HTTP RESPONSE HEADER TABLE

| Index | Header Name | Header Value | — 3420 |
|---|---|---|---|
| 0 | :status | 200 | |
| ... | ... | ... | |
| 34 | www-authenticate | | |

HTTP REQUEST HEADER TABLE — 3500

| Index | Header Name | Header Value | — 3510 |
|---|---|---|---|
| 0 | :scheme | http | |
| ... | ... | ... | |
| 37 | warning | | |
| 38 | x-my-header | first | |

3511　　3512　　3513

HTTP RESPONSE HEADER TABLE

| Index | Header Name | Header Value | — 3520 |
|---|---|---|---|
| 0 | :status | 200 | |
| ... | ... | ... | |
| 34 | www-authenticate | | |
| 35 | x-my-header | first | |

HTTP REQUEST HEADER TABLE — 3600, 3610

| Index | Header Name | Header Value |
|---|---|---|
| 0 | :scheme | http |
| ... | ... | ... |
| 37 | warning | |
| 38 | user-agent | UPnP/1.0 DLNADOC/1.50 |
| 39 | content-type | text/xm1; charset="utf-8" |
| 40 | soapaction | urn:schemas-upnp-org:service:ContentDirectory:1#Browse |
| 41 | soapaction | urn:schemas-upnp-org:service:ContentDirectory:1#Search |
| 42 | getcontentFeatures.dlna.org | 1 |

3611  3612  3613

HTTP RESPONSE HEADER TABLE — 3620

| Index | Header Name | Header Value |
|---|---|---|
| 0 | :status | 200 |
| ... | ... | ... |
| 34 | www-authenticate | |
| 35 | content-type | text/xm1; charset="utf-8" |
| 36 | contentfeatures.dlna.org | DLNA.ORG_PN=JPEG_LRG; DLNA_ORG_CI=1;DLNA.ORG_OP=01;DLNA.ORG_FLAGS=XXX |
| 37 | contentfeatures.dlna.org | DLNA.ORG_PN=JPEG_SM; DLNA_ORG_CI=0;DLNA.ORG_OP=01;DLNA.ORG_FLAGS=XXX |

3621  3622  3623

COMMUNICATION APPARATUS, COMMUNICATION METHOD, AND NON-TRANSITORY COMPUTER-READABLE MEDIUM

BACKGROUND OF THE INVENTION

Field of the Invention

The present invention relates to a communication apparatus and a communication method which compress a message header when performing message communication.

Description of the Related Art

There is provided HTTP (Hyper Text Transfer Protocol) as one of protocols generally widely used as Internet standard techniques. In IETF® (Internet Engineering Task Force), the new version HTTP/2 of the HTTP standard is now stipulated (see M. Balshe and three others "Hypertext Transfer Protocol version 2", [online], Apr. 23, 2014, Internet <URL: http://www.ietf.org/id/draft-ietf-httpbis-http2-03.txt>).

As a new function of HTTP/2, there is provided an HTTP header compression function. The HTTP header compression function performs data compression for HTTP header information using a kind of dictionary called an HTTP header table, and transmits/receives only a difference in HTTP header information between a server and a client (see R. Peon and H. Ruellan, "HTTP Header Compression for HTTP/2", [online], Apr. 3, 2014, Internet <URL:http://www.ietf.org/id/draft-ietf-httpbis-header-compression-00.txt>). This can reduce the data size of an HTTP communication message transmitted/received between a server and a client.

However, the above-described HTTP header compression function newly creates an HTTP header table every time HTTP communication starts. This unwantedly increases the processing load of HTTP header table creation processing and a communication delay caused by the creation time in both the server and client.

SUMMARY OF THE INVENTION

In one aspect, a communication apparatus comprising: a generation unit configured to generate a first header compression table for compressing a header portion of a message to be communicated based on a first communication connection established with another communication apparatus; a transmission unit configured to transmit, to the other communication apparatus based on the first communication connection established with the other communication apparatus, the message whose header portion has been compressed based on the first header compression table generated by the generation unit; a determination unit configured to determine whether the first header compression table is used as a second header compression table for compressing a header portion of a message to be communicated based on a second communication connection which is different from the first communication connection and has been established with the other communication apparatus; and a compression unit configured to compress the header portion of the message to be communicated based on the second communication connection using the first header compression table corresponding to the first communication connection as the second header compression table corresponding to the second communication connection in accordance with determination by the determination unit.

Further features of the present invention will become apparent from the following description of exemplary embodiments (with reference to the attached drawings).

BRIEF DESCRIPTION OF THE DRAWINGS

FIG. 12A is a flowchart illustrating the operation procedure of HTTP header table confirmation and notification processing by the first communication apparatus.

FIG. 12B is a flowchart illustrating an operation procedure of receiving an HTTP header selection notification from the second communication apparatus.

FIG. 17 is a sequence chart showing message examples from communication connect processing to communication disconnection processing by a first communication apparatus according to the second embodiment.

FIGS. 24A and 24B are tables each showing an example of an HTTP header table.

FIG. 25 is a table showing an example of a unique HTTP header table according to the fifth embodiment.

DESCRIPTION OF THE EMBODIMENTS

Embodiments of the present invention will be described below with reference to the accompanying drawings. Note that the following embodiments are not intended to limit the claims of the present invention, and that not all the combinations of features described in the embodiments are necessarily essential to the solution of the present invention.

First Embodiment

System Configuration

Figure 1A:
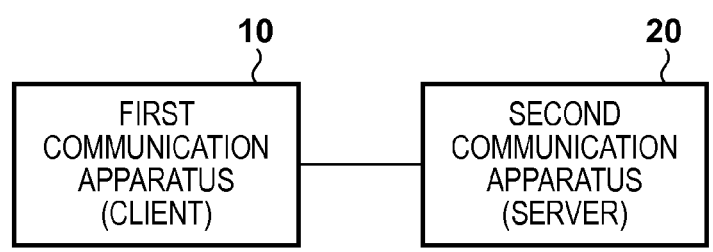
FIG. 1A is a block diagram showing the configuration of a communication system according to the first embodiment.

FIG. 1A is a block diagram showing the configuration of a communication system according to this embodiment.

A first communication apparatus 10 is a communication apparatus serving as a client according to the present invention, and has a wireless LAN (Local Area Network) communication function complying with IEEE802.11. Examples of the first communication apparatus 10 are a digital camera, digital video camera, mobile phone, smartphone, personal computer (PC), notebook PC, server, and tablet. Note that an example of using the wireless LAN communication function will be described in this embodiment. The present invention, however, is not limited to this, and other wireless communication functions such as Bluetooth®, ZigBee®, and RFID (Radio Frequency Identifier) may be used. Also, a wired LAN communication function such as Ethernet® or a combination of a wireless LAN communication function and wired LAN communication function may be used.

A second communication apparatus 20 is a communication apparatus serving as a server according to the present invention, and performs direct wireless LAN connection to the first communication apparatus 10. Note that in this embodiment, an example of performing direct wireless LAN connection between the first communication apparatus 10 and the second communication apparatus 20 will be described. The present invention, however, is not limited to this, and the first communication apparatus 10 and the second communication apparatus 20 may be connected through a wireless access point. The first communication apparatus 10 and the second communication apparatus 20 perform HTTP communication complying with the HTTP/2 standard.

Figure 1B:
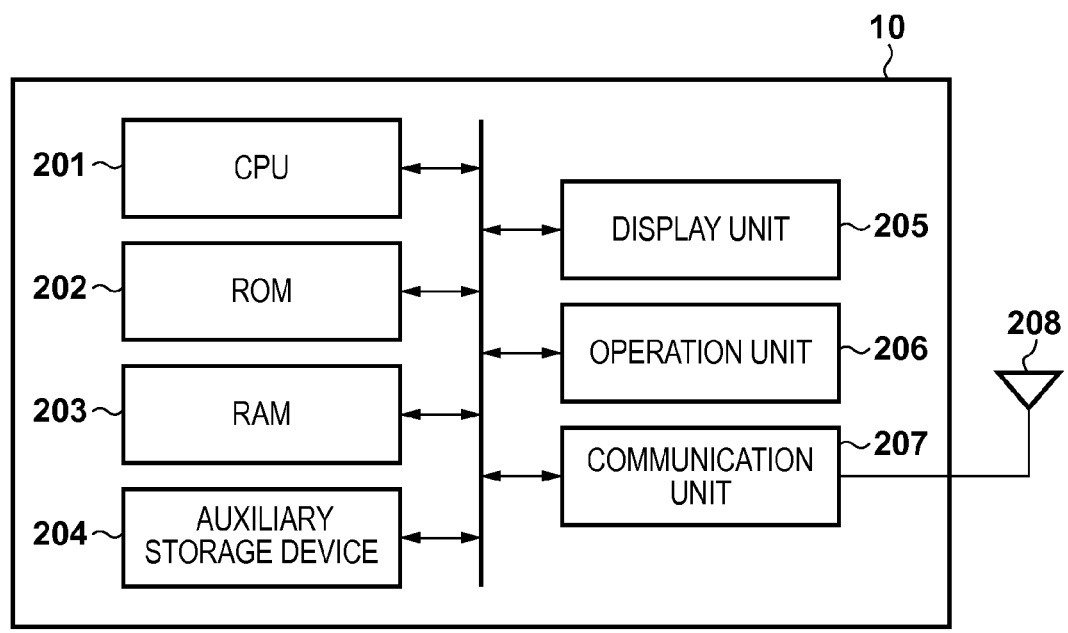
FIG. 1B is a block diagram showing the arrangement of a first communication apparatus according to the first embodiment.

The components of a communication apparatus according to this embodiment will be described in detail. FIG. 1B is a block diagram showing the hardware arrangement of the first communication apparatus 10 according to this embodiment. Note that the second communication apparatus 20 also has the same arrangement as that of the first communication apparatus 10, and only the first communication apparatus 10 will be explained. The first communication apparatus 10 includes a CPU (Central Processing Unit) 201, a ROM (Read Only Memory) 202, a RAM (Random Access Memory) 203, and an auxiliary storage device 204. The first communication apparatus 10 also includes a display unit 205, an operation unit 206, a communication unit 207, and an antenna 208. The CPU 201 controls the overall first communication apparatus 10. The ROM 202 stores programs and parameters which need not be changed. The RAM 203 temporarily stores programs and data supplied from the auxiliary storage device 204 or the like. The auxiliary storage device 204 stores data such as an image content and video content. The display unit 205 displays a GUI (Graphical User Interface) to be used by the user to operate the first communication apparatus 10. The operation unit 206 serves as an input interface used by the user to operate the first communication apparatus 10. The communication unit 207 controls the antenna 208, and performs wireless LAN communication with a wireless access point 30 or the second communication apparatus 20.

Function Module Arrangement

Figure 2:
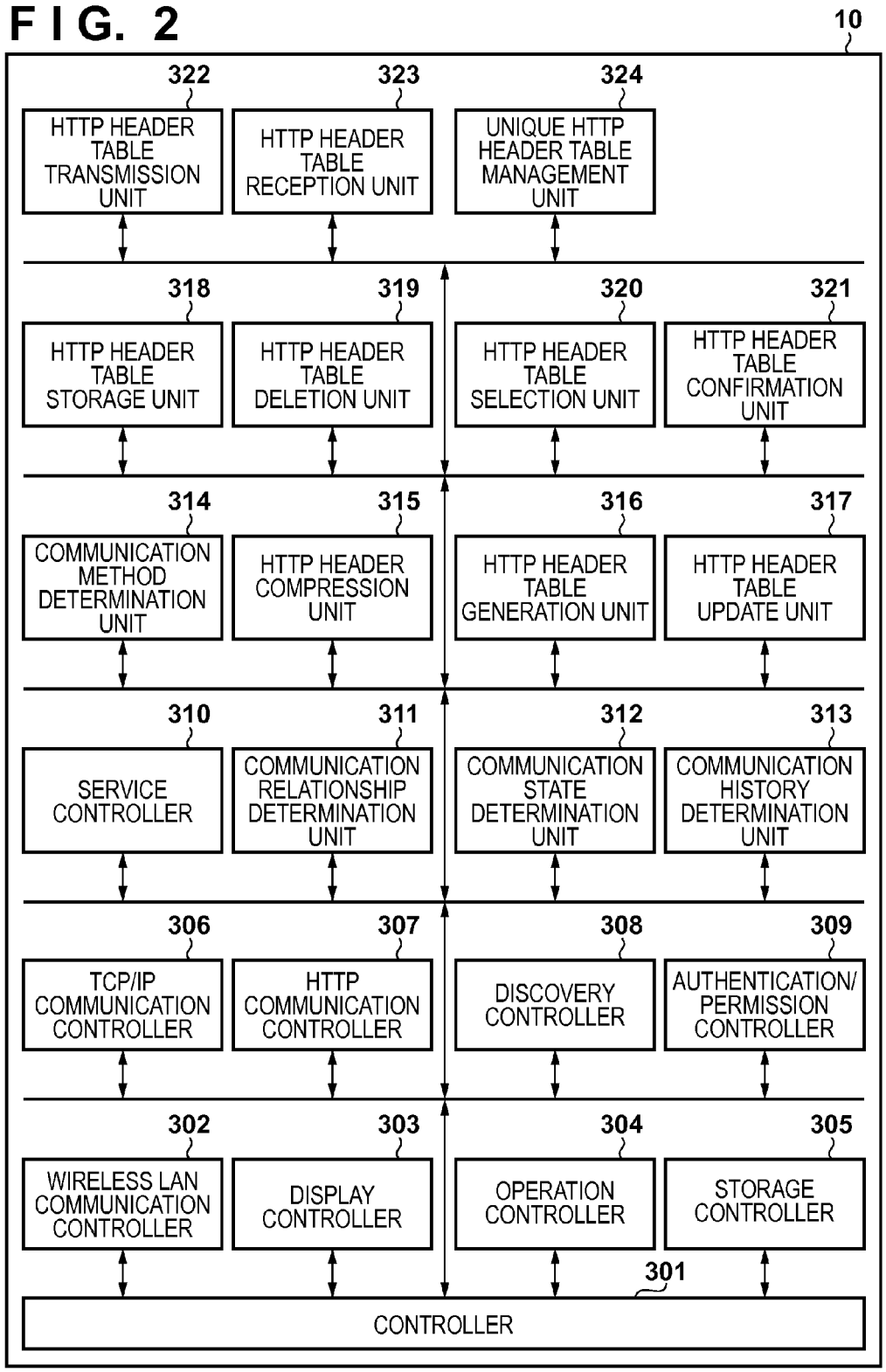
FIG. 2 is a block diagram showing the function module arrangement of the first communication apparatus.

FIG. 2 is a block diagram showing the function module arrangement of the first communication apparatus 10 according to this embodiment. Note that the second communication apparatus 20 also has the same arrangement as that of the first communication apparatus 10, and only the first communication apparatus 10 will be described.

A controller 301 controls all the function modules of the first communication apparatus 10. A wireless LAN communication controller 302 controls the communication unit 207 to perform communication control of a wireless LAN communication method with the wireless access point (not shown) or the second communication apparatus 20. The display controller 303 controls the display unit 205 to perform display control of the GUI in the first communication apparatus 10. An operation controller 304 controls the operation unit 206 to perform operation input control from the user to the first communication apparatus 10. A storage controller 305 controls the RAM 203 or auxiliary storage device 204 to store or delete processing data or data such as an image content or video content.

A TCP/IP communication controller 306 performs communication control of the TCP/IP (Transmission Control Protocol/Internet Protocol) method with the second communication apparatus 20 using the wireless LAN communication controller 302. Note that an example of using TCP/IP communication will be explained in this embodiment. The present invention, however, is not limited to this, and UDP (User Datagram Protocol) may be used.

An HTTP communication controller 307 performs communication control of the HTTP/2 method with the second communication apparatus 20 using the TCP/IP communication controller 306. Furthermore, the HTTP communication controller 307 performs communication control of the HTTPS (HTTP Security) method using TLS (Transport Layer Security) with the second communication apparatus 20.

A discovery controller 308 performs discovery control of a communication apparatus on the wireless LAN using the TCP/IP communication controller 306 or HTTP communication controller 307. More specifically, the discovery controller 308 has a function of discovering the second communication apparatus 20 on the wireless LAN. The discovery controller 308 also has a function of notifying the second communication apparatus 20 on the wireless LAN that the first communication apparatus 10 has joined or left. In this embodiment, the discovery controller 308 uses the SSDP (Simple Service Discovery Protocol) method used in the UPnP (Universal Plug and Play) standard. Note that the discovery controller 308 may use another discovery method instead of SSDP. Examples of the other discovery method are mDNS (multicast Domain Name Service), Bonjour®, and SDP (Service Discovery Protocol).

By using the HTTP communication controller 307, an authentication controller 309 controls authentication processing of the user or the first communication apparatus 10 with the second communication apparatus 20. In this embodiment, the authentication controller 309 uses the HTTP authentication (Basic authentication/Digest authentication) method. Note that the authentication controller 309 may use other authentication methods such as OAuth 2.0, OpenID®, OpenID® Connect, and SAML (Security Assertion Markup Language).

By using the HTTP communication controller 307, a service controller 310 controls provision of a service to the second communication apparatus 20 or the use of a service provided by the second communication apparatus 20. In this embodiment, the service controller 310 uses each of DLNA® (Digital Living Network Alliance), UPnP, and a Web service method. Note that the present invention is not limited to them, and the service controller 310 may use other service control methods. For example, the service controller 310 may use SOAP (Simple Object Access Protocol), REST (Representational State Transfer), AtomPub (Atom Publishing Protocol), and the like.

Communication Relationship Determination

A module of determining the presence/absence of a communication relationship with the second communication apparatus 20 will be described. By using one or more of a communication state determination unit 312, communication history determination unit 313, and communication method determination unit 314 (all of which will be described later), a communication relationship determination unit 311 determines the presence/absence of a communication relationship as the status of a connection to the second communication apparatus 20 through the network.

The communication state determination unit 312 determines the presence/absence of a communication relationship with the second communication apparatus 20 based on the communication state with the second communication apparatus 20. This determination processing is performed based on the following communication state.

The wireless LAN communication controller 302 is used to determine the presence/absence of a communication relationship based on a wireless LAN communication state with the second communication apparatus 20. For example, the determination processing is performed based on the start/end of wireless LAN connection, completion of authentication at the time of wireless LAN communication, detection/non-detection of a beacon, a wireless LAN connection mode (infrastructure more or ad hoc mode), and the like. Alternatively, the determination processing may be performed based on the start/end of Wi-Fi Direct® connection, a wireless LAN communication error, and the like.

The TCP/IP communication controller 306 is used to determine the presence/absence of a communication relationship based on a TCP/IP communication state with the second communication apparatus 20. For example, the determination processing is performed based on TCP connection/disconnection, an error occurrence state, a delay state, a packet retransmission state, a data transfer amount, a sequence control state, line quality, a TCP/IP communication error, and the like.

The HTTP communication controller 307 is used to determine the presence/absence of a communication relationship based on an HTTP communication state with the second communication apparatus 20. For example, the determination processing is performed based on the start (HEADERS+PRIORITY frame)/end (GOAWAY frame) of HTTP communication, a simultaneous HTTP communication count (multi-session count), an HTTP communication error, and the like.

The discovery controller 308 is used to determine the presence/absence of a communication relationship based on a discovery state with the second communication apparatus 20 on the wireless LAN. For example, the determination processing is performed based on the joining/leaving operation of the first communication apparatus 10 with respect to the wireless LAN, the discovery/joining/leaving operation of the second communication apparatus 20 on the wireless LAN, and the like.

The authentication controller 309 is used to determine the presence/absence of a communication relationship based on an authentication state with the second communication apparatus 20. For example, the determination processing is performed based on the start/end of authentication, login/logout of the user, an authenticated/unauthenticated state, a permitted/unpermitted state, whether the valid period of authentication expires or not, validation/invalidation of an access token, whether the valid period of an access token expires or not, and the like.

The service controller 310 is used to determine the presence/absence of a communication relationship based on the service provision/use state with the second communication apparatus 20. For example, the determination processing is performed based on the start/end of provision of a service, the start/end of the use of a service, and the like.

The communication state determination unit 312 may determine the presence/absence of a communication relationship based on a combination of the plurality of communication states described above.

The communication history determination unit 313 determines the presence/absence of a communication relationship with the second communication apparatus 20 based on a communication history with the second communication apparatus 20. This determination processing is performed based on the following communication history.

First, the wireless LAN communication controller 302 is used to determine the presence/absence of a communication relationship based on a wireless LAN communication history with the second communication apparatus 20. For example, the determination processing is performed based on the presence/absence of wireless LAN connection/disconnection to/from the second communication apparatus 20 so far, a connection mode (infrastructure mode/ad hoc mode, Wi-Fi Direct®, or a persistent/temporary group of Wi-Fi Direct®), and the like.

The TCP/IP communication controller 306 is used to determine the presence/absence of a communication relationship based on a TCP/IP communication history with the second communication apparatus 20. For example, the determination processing is performed based on the domain name, host name, IP address, and port number of the second communication apparatus 20, the presence/absence of TCP/IP connection/disconnection to/from the second communication apparatus 20 so far, and the like.

The HTTP communication controller 307 is used to determine the presence/absence of a communication relationship based on an HTTP communication history with the second communication apparatus 20. For example, the determination processing is performed based on the URI of the second communication apparatus 20, contents of a transmitted HTTP request, contents of a received HTTP response, an HTTP communication (session) ID, an HTTP stream ID, a cookie, and the like.

The discovery controller 308 is used to determine the presence/absence of a communication relationship based on a discovery history with the second communication apparatus 20 on the wireless LAN. For example, the determination processing is performed based on the presence/absence, count, and date/time of the joining/leaving operation of the first communication apparatus 10 with respect to the wireless LAN, the presence/absence, count, and date/time of the discovery/joining/leaving operation of the second communication apparatus 20 on the wireless LAN, and the like.

The authentication controller 309 is used to determine the presence/absence of a communication relationship based on an authentication history with the second communication apparatus 20. For example, the determination processing is performed based on the presence/absence, count, and date/time of an authentication/login/logout operation, authentication information such as an ID and password, a permission count, and the like. Alternatively, the determination processing may be performed based on the ID/authority range/count/valid period of an issued access token, an invalidated access token, and the like.

The service controller 310 is used to determine the presence/absence of a communication relationship based on a service provision/use history with the second communication apparatus 20. For example, the type/contents of a service provided/used, the presence/absence of provision/use of a service, and the like are determined.

Furthermore, the presence/absence of communication connection/disconnection to/from the second communication apparatus 20 so far, a communication count, a communication date/time, communication success/failure, an error type, and the like are determined regardless of the communication type.

The communication history determination unit 313 may determine the presence/absence of a communication relationship based on a combination of the plurality of communication histories described above.

The communication method determination unit 314 determines the presence/absence of the communication relationship with the second communication apparatus 20 based on a communication method with the second communication apparatus 20. This determination processing is performed based on the following communication method.

First, the wireless LAN communication controller 302 is used to determine the presence/absence of a communication relationship based on a wireless LAN communication method with the second communication apparatus 20. For example, the determination processing is performed based on the presence/absence of wireless direct communication with the second communication apparatus 20, the presence/absence of WPS (Wi-Fi Protected Setup™) communication, and the like. Alternatively, the determination processing may be performed based on the presence/absence of Wi-Fi Direct® communication, the presence/absence of Wi-Fi Direct® Service communication, the presence/absence of Wi-Fi Miracast® communication, and the like.

The TCP/IP communication controller 306 is used to determine the presence/absence of a communication relationship based on a TCP/IP communication method with the second communication apparatus 20. For example, the determination processing is performed based on the presence/absence of VPN (Virtual Private Network) communication, the presence/absence of IPsec (Security Architecture for Internet Protocol) communication, and the like.

The HTTP communication controller 307 is used to determine the presence/absence of a communication relationship based on an HTTP communication method with the second communication apparatus 20. For example, the determination processing is performed based on the presence/absence of HTTPS (TLS) communication, the presence/absence of PROXY communication, and the like.

The discovery controller 308 is used to determine the presence/absence of a communication relationship based on a discovery method with the second communication apparatus 20 on the wireless LAN. For example, the determination processing is performed based on the presence/absence of SSDP, the presence/absence of mDNS, the presence/absence of Bonjour®, the presence/absence of SDP, and the like.

The authentication controller 309 is used to determine the presence/absence of a communication relationship based on an authentication method with the second communication apparatus 20. For example, the determination processing is performed based on the presence/absence of HTTP authentication (Basic authentication and Digest authentication), the presence/absence of OAuth 2.0, the presence/absence of OpenID®, the presence/absence of OpenID® Connect, the presence/absence of SAML, and the like.

The service controller 310 is used to determine the presence/absence of a communication relationship based on a service provision/use method with the second communication apparatus 20. For example, the determination processing is performed based on the presence/absence of DLNA®, the presence/absence of UPnP, the presence/absence of SOAP, the presence/absence of REST, the presence/absence of AtomPub, and the like.

The communication history determination unit 313 may determine the presence/absence of a communication relationship based on a combination of the plurality of communication methods described above.

HTTP Header Compression

A module for HTTP header compression will be described. An HTTP header compression unit 315 performs HTTP header compression processing by the HTTP/2 method based on an HTTP header table selected by an HTTP header table selection unit 320 (to be described later). In the first communication apparatus 10 serving as a client, the HTTP header compression unit 315 compresses an HTTP header serving as the message header of an HTTP request message generated by the HTTP communication controller 307. Similarly, the HTTP header compression unit 315 of the first communication apparatus 10 decompresses the compressed HTTP header of an HTTP response message received by the HTTP communication controller 307 from the second communication apparatus 20. On the other hand, in the second communication apparatus 20 serving as a server, the HTTP header compression unit 315 compresses the HTTP header of the HTTP response message generated by the HTTP communication controller 307. Similarly, the HTTP header compression unit 315 of the second communication apparatus 20 decompresses the HTTP header of the HTTP request message received by the HTTP communication controller 307 from the first communication apparatus 10.

An HTTP header table generation unit 316 creates an initial HTTP header table defined by the HTTP/2 method. A practical example of the initial HTTP header table according to this embodiment will be described later with reference to FIG. 24A.

An HTTP header table update unit 317 updates an HTTP header table (request header table) based on the HTTP request header transmitted and compressed by the HTTP communication controller 307 and HTTP header compression unit 315. Similarly, the HTTP header table update unit 317 updates an HTTP header table (response header table) based on the HTTP response header received and decompressed by the HTTP communication controller 307 and HTTP header compression unit 315.

An HTTP header table storage unit 318 stores an HTTP header table using the storage controller 305. In this embodiment, the HTTP header table storage unit 318 stores an HTTP header table generated by the HTTP header table generation unit 316 and used for HTTP communication with the second communication apparatus 20, and an HTTP header table received by an HTTP header table reception unit 323. Note that the HTTP header table selection unit 320 can also hold, for example, a header table associated with communication with another communication apparatus different from the second communication apparatus 20.

An HTTP header table deletion unit 319 deletes an HTTP header table using the storage controller 305. In this embodiment, the HTTP header table deletion unit 319 deletes an HTTP header table used for HTTP communication with the second communication apparatus 20 or an HTTP header table stored in the HTTP header table storage unit 318.

By using the communication relationship determination unit 311, the HTTP header table selection unit 320 selects an HTTP header table to be used by the HTTP header compression unit 315. For example, if the presence of a communication relationship with the second communication apparatus 20 is determined, the HTTP header table selection unit 320 selects an HTTP header table corresponding to the communication relationship with the second communication apparatus 20. On the other hand, if the absence of the communication relationship is determined, the HTTP header table selection unit 320 selects the initial HTTP header table generated by the HTTP header table generation unit 316. Note that the HTTP header table selection unit 320 selects an HTTP header table from the HTTP header table storage unit 318.

As described above, the HTTP header compression unit 315 can perform HTTP header compression processing by the HTTP/2 method using the HTTP header table selected by the HTTP header table selection unit 320. That is, based on the first header compression table corresponding to the first communication connection, the HTTP header compression unit 315 can compress the header portion of a message to be communicated based on the first communication connection. Furthermore, based on the second header compression table corresponding to the second communication connection, the HTTP header compression unit 315 can compress the header portion of a message to be communicated based on the second communication connection. The HTTP header compression unit 315 can also use the first header compression table corresponding to the first communication connection as the second header compression table corresponding to the second communication connection in accordance with the selection result of the HTTP header table selection unit 320.

By using the HTTP communication controller 307, an HTTP header table confirmation unit 321 confirms whether the second communication apparatus 20 holds the same HTTP header table as that held by the first communication apparatus 10. This confirmation processing is determined based on whether CRC (Cyclic Redundancy Check) data calculated based on data of the HTTP header tables coincide with each other. Note that an HTTP header table confirmation method is not limited to this. The HTTP header table reception unit 323 may be used to receive the data of the HTTP header table from the second communication apparatus 20, and it may be determined whether the data is the same. Note that any methods may be used as long as it is possible to determine whether the second communication apparatus 20 holds the same HTTP header table, and a unique HTTP header table management unit 324 (to be described later) may be used to perform the determination processing.

An HTTP header table transmission unit 322 transmits the HTTP header table to the second communication apparatus 20 using the TCP/IP communication controller 306 or HTTP communication controller 307. The HTTP header table reception unit 323 receives the HTTP header table from the second communication apparatus 20 using the TCP/IP communication controller 306 or HTTP communication controller 307.

By using the storage controller 305, the unique HTTP header table management unit 324 manages a unique HTTP header table corresponding to a communication method supported by the first communication apparatus 10. The unique HTTP header table is an HTTP header table optimized for a predetermined communication method. A predetermined HTTP header name to be used by the predetermined communication method, and an HTTP header value are preset in the HTTP header table. Note that the unique HTTP header table management unit 324 may manage a plurality of unique HTTP header tables corresponding to a plurality of communication methods supported by the first communication apparatus 10.

FIG. 24A shows a practical example of the data structure of the HTTP header table according to this embodiment. Referring to FIG. 24A, an HTTP header table 3400 is formed from an HTTP request header table 3410 to be used to compress the header of an HTTP request, and an HTTP response header table 3420 to be used to compress the header of an HTTP response. The HTTP request header table 3410 is formed from an index 3411 indicating a number in the table, an HTTP request header name 3412, and an HTTP request header value 3413. Similarly to the HTTP request header table 3410, the HTTP response header table 3420 is formed from an index 3421 indicating a number in the table, an HTTP response header name 3422, and an HTTP response header value 3423.

Note that this embodiment has exemplified a case in which the HTTP header table 3400 is formed from the HTTP request header table 3410 and HTTP response header table 3420. However, it is possible to collectively manage these tables as one table.

Communication Sequence

A communication sequence between the first communication apparatus 10 and the second communication apparatus 20 according to this embodiment will be described in detail below.

Communication Connection to Disconnection (Mainstream)

Figure 3:
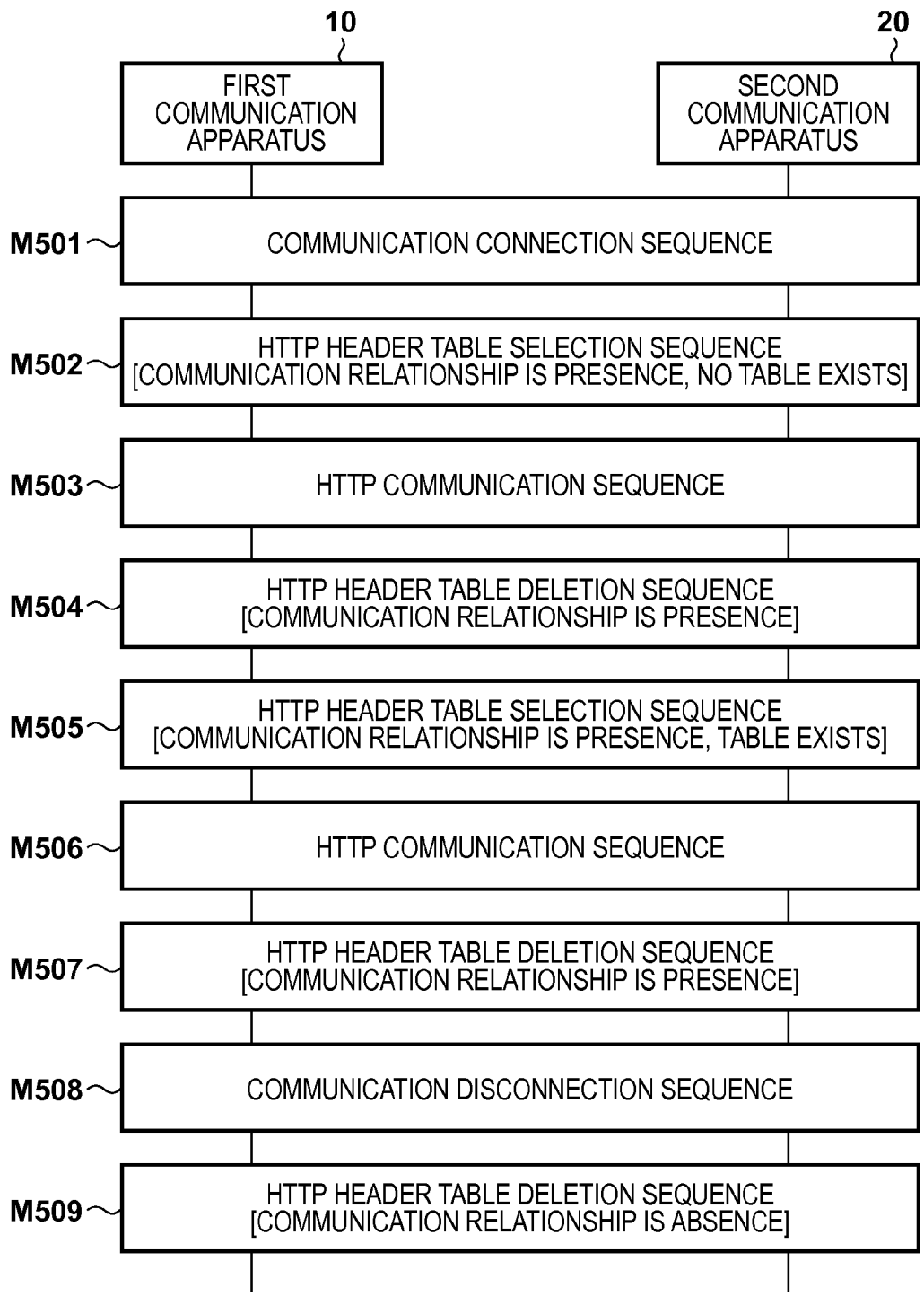
FIG. 3 is a sequence chart showing message examples when the first communication apparatus performs processing from communication connection to a second communication apparatus to communication disconnection.

FIG. 3 is a sequence chart showing message examples when the first communication apparatus 10 performs processing from communication connection to the second communication apparatus 20 to communication disconnection. In this embodiment, the first communication apparatus 10 determines a communication relationship based on the communication state of wireless LAN communication with the second communication apparatus 20.

In step M501, the first communication apparatus 10 performs wireless LAN communication connection to the second communication apparatus 20. The detailed sequence of this communication connection processing will be described later with reference to FIG. 7B.

In step M502, the first communication apparatus 10 selects an HTTP header table to be used with the second communication apparatus 20. The detailed sequence of this table selection processing will be described later with reference to FIG. 8A. In step M502, the first communication apparatus 10 determines the presence of a communication relationship with the second communication apparatus 20. Since, however, HTTP communication with the second communication apparatus 20 has not been performed yet, an HTTP header table is newly created.

In step M503, the first communication apparatus 10 performs HTTP communication with the second communication apparatus 20 using the HTTP header table selected in step M502. That is, in step M503, the first communication apparatus 10 performs HTTP communication based on an established communication connection to the second communication apparatus 20. The detailed sequence of this HTTP communication processing will be described later with reference to FIG. 4. In step M503, a series of processes, that is, HTTP communication connection processing, HTTP request transmission/response reception processing, and HTTP communication disconnection processing are performed.

In response to the HTTP communication disconnection processing in step M503, the first communication apparatus 10 determines whether to delete the HTTP header table used with the second communication apparatus 20. In other words, when the first communication apparatus 10 disconnects the communication connection established to the second communication apparatus 20, it determines whether to reuse the HTTP header table used in the communication connection. The detailed sequence of the table deletion processing will be described later with reference to FIG. 9. In step M504, the first communication apparatus 10 determines the presence of the communication relationship with the second communication apparatus 20, and stores the HTTP header table used with the second communication apparatus 20. Furthermore, the second communication apparatus 20 also determines the presence of the communication relationship with the first communication apparatus 10, and stores the HTTP header table used with the first communication apparatus 10.

In step M505, the first communication apparatus 10 selects an HTTP header table to be used with the second communication apparatus 20. The detailed sequence of this table selection processing will be described later with reference to FIG. 8A. Since the first communication apparatus 10 determines the presence of the communication relationship with the second communication apparatus 20 in step M505, and the HTTP header table used with the second communication apparatus 20 in step M503 exists, the first communication apparatus 10 selects this HTTP header table. That is, the first communication apparatus 10 can use, for communication in the second communication connection established between the first communication apparatus 10 and the second communication apparatus 20, the first HTTP header table used in the first communication connection established to the second communication apparatus 20. Note that the first and second communication connections are different communication connections. The communication connection according to this embodiment indicates a connection in the transport layer.

Figure 4:
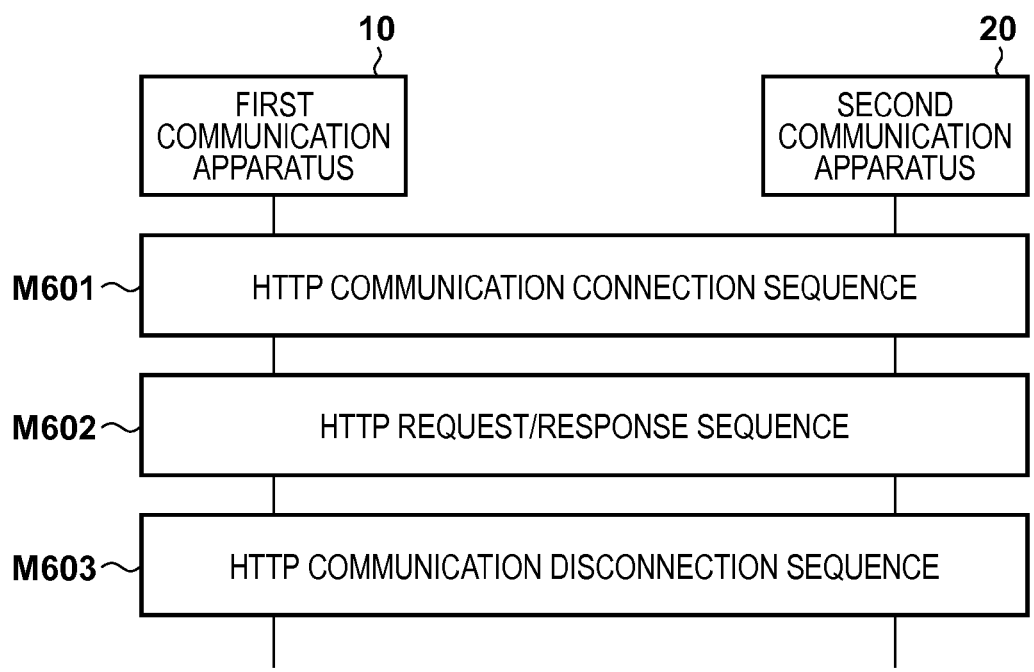
FIG. 4 is a sequence chart showing message examples when the first communication apparatus performs HTTP communication processing.

In step M506, the first communication apparatus 10 performs HTTP communication with the second communication apparatus 20 using the HTTP header table selected in step M505. FIG. 4 shows the detailed sequence of this HTTP communication processing, similarly to step M503.

Figure 9:
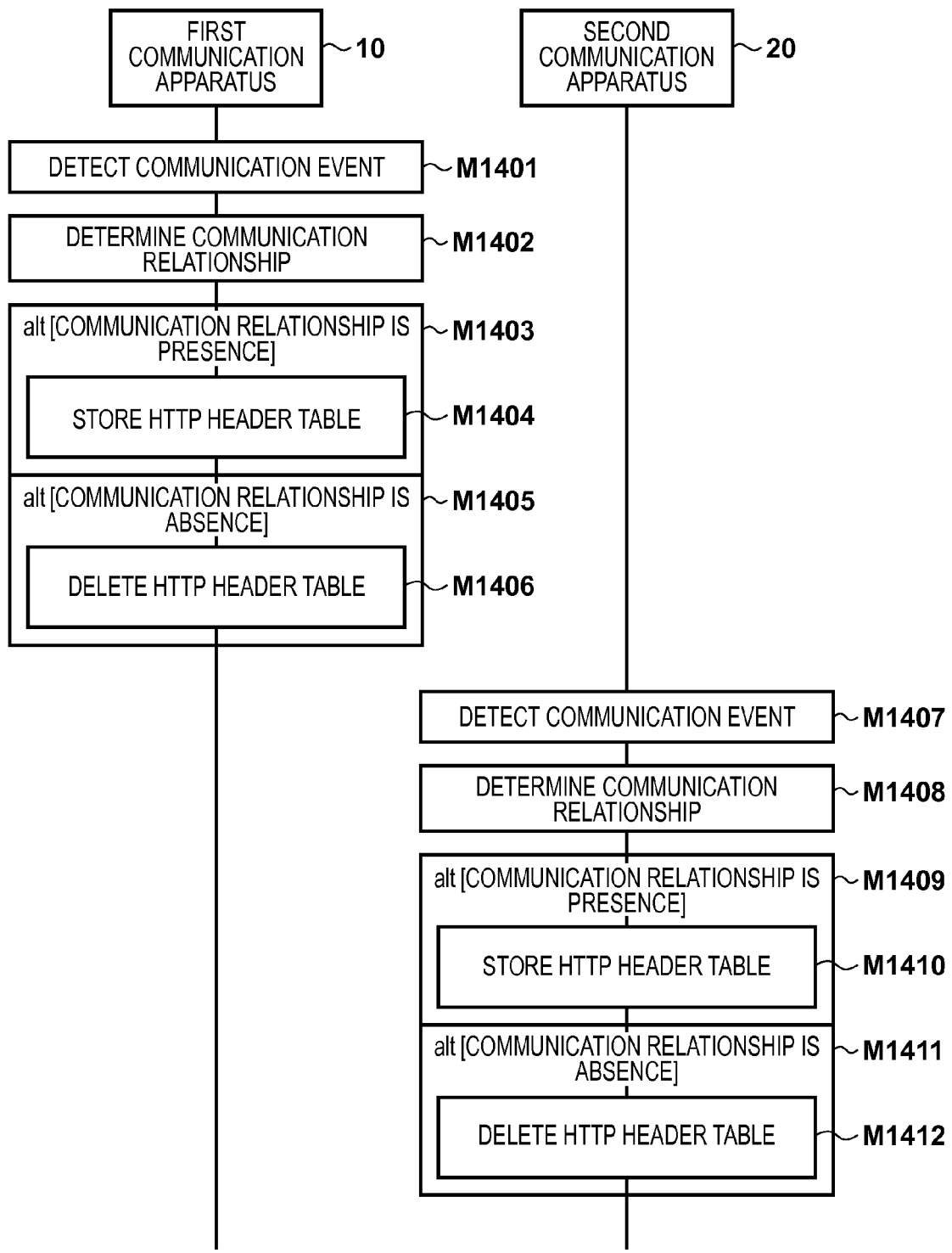
FIG. 9 is a sequence chart showing message examples when the first communication apparatus performs HTTP header table deletion processing.

In response to the HTTP communication disconnection processing in step M506, the first communication apparatus 10 determines, in step M507, to delete the HTTP header table used with the second communication apparatus 20. FIG. 9 shows the sequence of this table deletion processing, similarly to step M504. In step M507, the first communication apparatus 10 determines the presence of the communication relationship with the second communication apparatus 20, and stores the HTTP header table used with the second communication apparatus 20. The second communication apparatus 20 also determines the presence of the communication relationship with the first communication apparatus 10, and stores the HTTP header table used with the first communication apparatus 10.

In step M508, the first communication apparatus 10 performs wireless LAN communication disconnection from the second communication apparatus 20. The detailed sequence of this communication disconnection processing will be described later with reference to FIG. 7C.

In response to the wireless LAN communication disconnection processing in step M508, the first communication apparatus 10 determines, in step M509, to delete the HTTP header table used with the second communication apparatus 20. FIG. 9 shows the sequence of this table deletion processing, similarly to step M504. In step M509, the first communication apparatus 10 determines the absence of the communication relationship with the second communication apparatus 20, and deletes the HTTP header table used with the second communication apparatus 20. The second communication apparatus 20 also determines the absence of the communication relationship with the first communication apparatus 10, and deletes the HTTP header table used with the first communication apparatus 10.

HTTP Communication Sequence (M503, M506)

FIG. 4 is a sequence chart showing message examples when the first communication apparatus 10 performs HTTP communication with the second communication apparatus 20 according to this embodiment, and shows details of steps M503 and M506 described above.

In step M601, the first communication apparatus 10 performs HTTP communication connection to the second communication apparatus 20. The detailed sequence of this communication connection processing will be described later with reference to FIG. 5.

In step M602, the first communication apparatus 10 transmits an HTTP request to the second communication apparatus 20, and receives an HTTP response from the second communication apparatus 20. The detailed sequence of the HTTP request/response will be described later with reference to FIG. 6.

In step M603, the first communication apparatus 10 performs HTTP communication disconnection from the second communication apparatus 20. The detailed sequence of this communication disconnection processing will be described alter with reference to FIG. 7A.

HTTP Communication Connection Sequence (M601)

Figure 5:
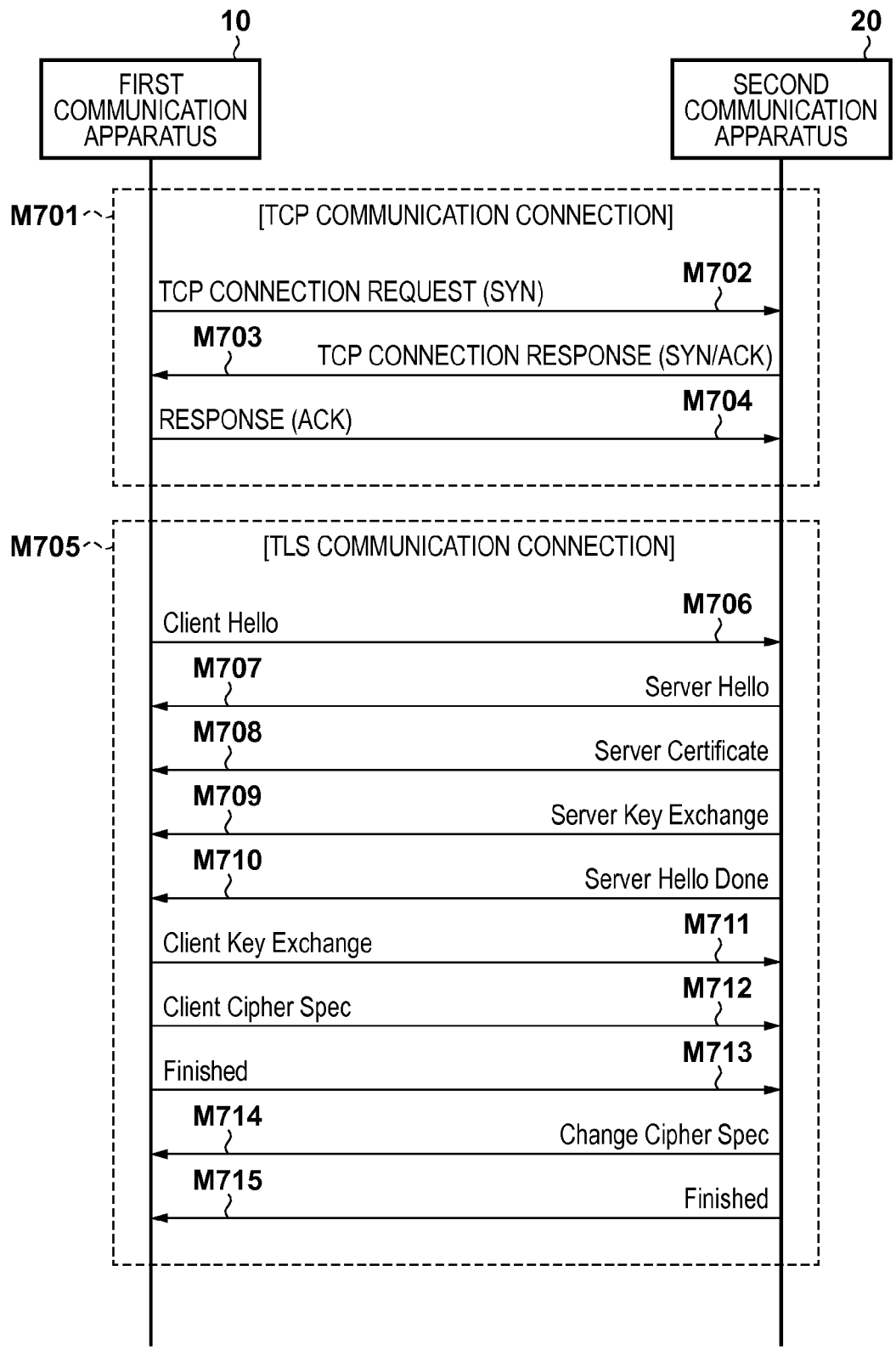
FIG. 5 is a sequence chart showing message examples when the first communication apparatus performs HTTP communication connection processing.

FIG. 5 is a sequence chart showing message examples when the first communication apparatus 10 performs HTTP communication connection to the second communication apparatus 20, and shows details of step M601 described above.

First, in step M701 (M702 to M704), the first communication apparatus 10 performs TCP communication connection to the second communication apparatus 20. More specifically, in step M702, the first communication apparatus 10 transmits a TCP connection request (SYN frame) to the second communication apparatus 20. In step M703, the second communication apparatus 20 transmits a TCP connection request response (SYN/ACK frame) to the first communication apparatus 10. In step M704, the first communication apparatus 10 transmits a response (ACK frame) to the second communication apparatus 20.

In step M705 (M706 to M715), the first communication apparatus 10 performs TLS communication connection to the second communication apparatus 20. More specifically, in step M706, the first communication apparatus 10 transmits a list of usable encryption/compression algorithms to the second communication apparatus 20 (Client Hello). In step M707, the second communication apparatus 20 transmits a determined encryption/compression algorithm to the first communication apparatus 10 (Server Hello). In step M708, the second communication apparatus 20 transmits a route certificate and server certificate to the first communication apparatus 10 (Server Certificate). In step M709, the second communication apparatus 20 transmits server key information to the first communication apparatus 10 (Server Key Exchange).

In step M710, the second communication apparatus 20 transmits completion of the series of processes to the first communication apparatus 10 (Server Hello Done). In step M711, the first communication apparatus 10 transmits key information (premaster secret) to the second communication apparatus 20 (Client Key Exchange). In step M712, the first communication apparatus 10 transmits completion of preparation of the encryption algorithm to the second communication apparatus 20 (Change Cipher Spec). In step M713, the first communication apparatus 10 transmits completion of key exchange and authentication processing to the second communication apparatus 20 (Finished). In step M714, the second communication apparatus 20 transmits completion of preparation of the encryption algorithm to the first communication apparatus 10 (Change Cipher Spec). In step M715, the second communication apparatus 20 transmits the success of key exchange and authentication processing to the first communication apparatus 10 (Finished).

HTTP Request/Response Sequence (M602)

Figure 6:
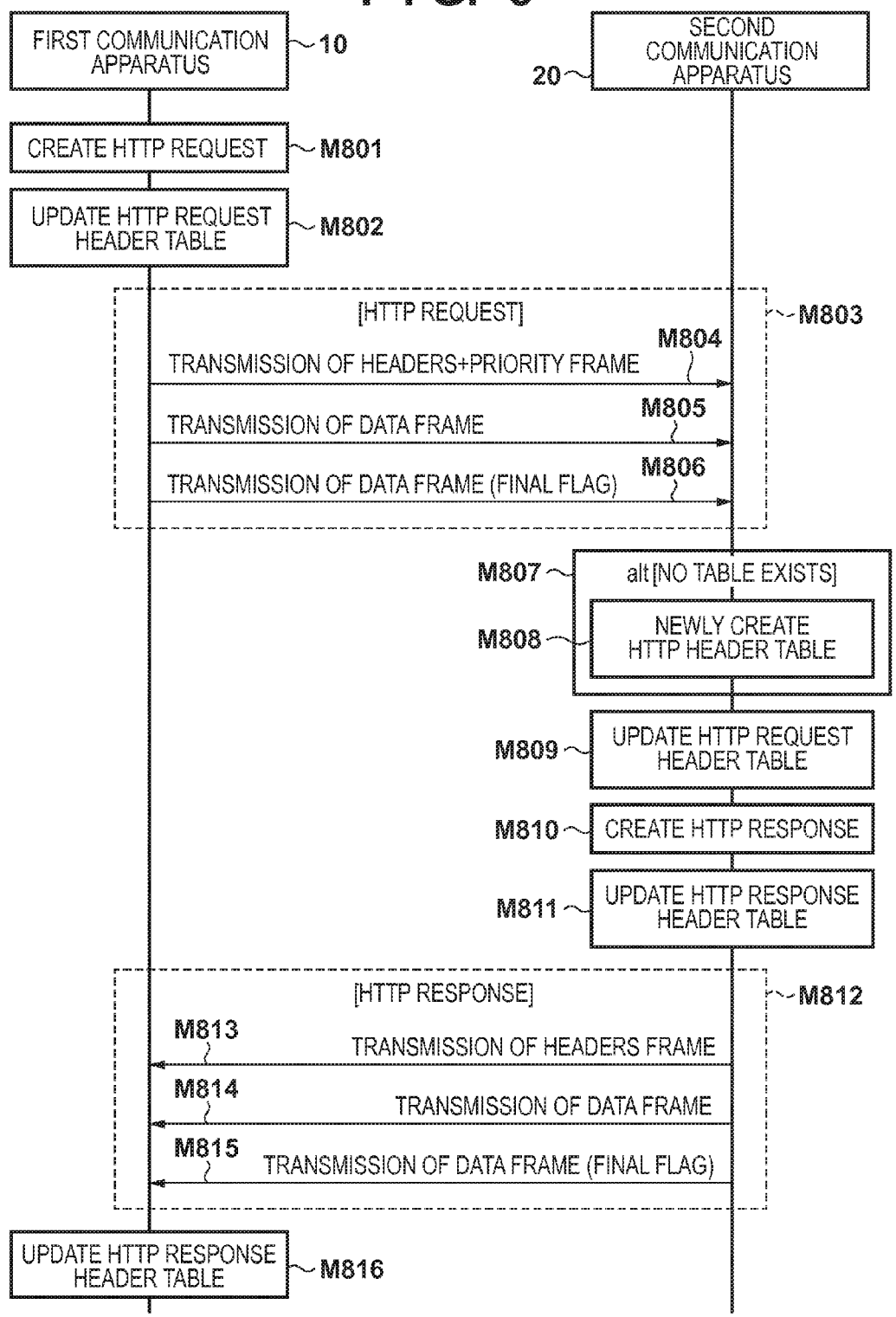
FIG. 6 is a sequence chart showing message examples when the first communication apparatus transmits HTTP request and receives an HTTP response.

FIG. 6 is a sequence chart showing message examples when the first communication apparatus 10 transmits an HTTP request to the second communication apparatus 20 and receives an HTTP response from the second communication apparatus 20, and shows details of step M602 described above.

In step M801, the first communication apparatus 10 creates an HTTP request to be transmitted to the second communication apparatus 20. At this time, the first communication apparatus 10 compresses an HTTP request header using an HTTP request header table. Of the HTTP request header, a portion which is described in the HTTP request header table is compressed but a new portion which is not described in the table is added to the header without compression.

In step M802, the first communication apparatus 10 updates the HTTP request header table based on the HTTP request header created in step M801. That is, when creating the HTTP request header in step M801, if there is a new portion which cannot be compressed, the corresponding portion is added to the HTTP request header table.

In step M803 (M804 to M806), the first communication apparatus 10 transmits the HTTP request complying with the HTTP/2 method to the second communication apparatus 20. More specifically, in step M804, the first communication apparatus 10 transmits a HEADERS+PRIORITY frame indicating an HTTP request line and HTTP request header to the second communication apparatus 20. In steps M805 and M806, the first communication apparatus 10 transmits DATA frames indicating an HTTP request body to the second communication apparatus 20. At this time, the first communication apparatus 10 assigns a FINAL flag to the last DATA frame (M806 in this example).

If there is no HTTP header table for the first communication apparatus 10 in step M807 (M808), the second communication apparatus 20 newly creates an HTTP header table in step M808.

In step M809, based on the HTTP request header of the HTTP request received from the first communication apparatus 10, the second communication apparatus 20 updates the HTTP request header table if there is a new portion.

In step M810, the second communication apparatus 20 creates an HTTP response to be transmitted to the first communication apparatus 10. At this time, the second communication apparatus 20 compresses an HTTP response header using the HTTP response header table. In step M811, the second communication apparatus 20 updates the HTTP response header table based on the HTTP response header created in step M810. As for the HTTP response header as well, a new portion is not compressed, and the HTTP response header table is updated in accordance with the uncompressed contents, similarly to the HTTP request header described in steps M801 and M802.

In step M812 (M813 to M815), the second communication apparatus 20 transmits the HTTP response complying with the HTTP/2 method to the first communication apparatus 10. More specifically, in step M813, the second communication apparatus 20 transmits a HEADERS frame indicating an HTTP status line and HTTP response header to the first communication apparatus 10. In steps M814 and M815, the second communication apparatus 20 transmits DATA frames indicating an HTTP response body to the first communication apparatus 10. Note that a FINAL flag is assigned to the last DATA frame (M815 in this example).

In step M816, based on the HTTP response header of the HTTP response received from the second communication apparatus 20, the first communication apparatus 10 updates the HTTP response header table if there is a new portion.

HTTP Communication Disconnection Sequence (M603)

Figure 7A:
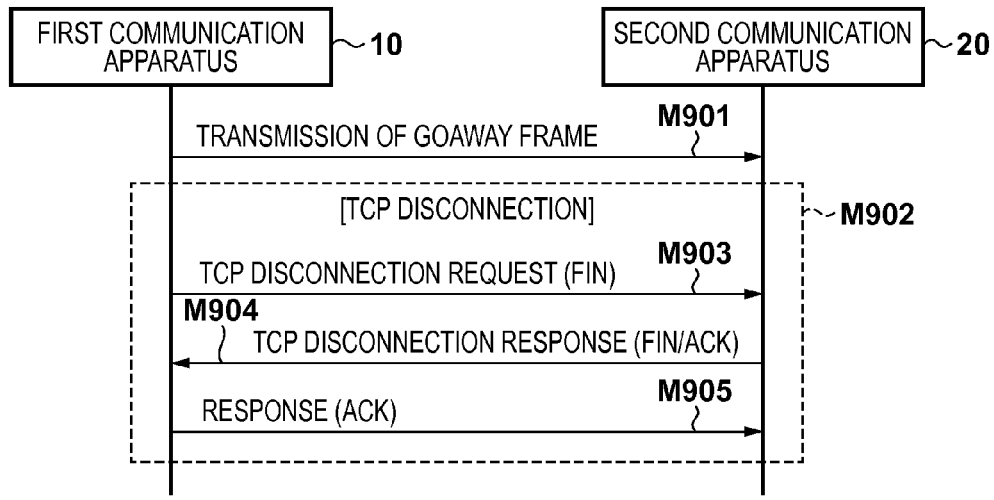
FIGS. 7A to 7C are sequence charts respectively showing message examples when the first communication apparatus performs HTTP communication disconnection processing, wireless LAN communication connection processing, and wireless LAN communication disconnection processing.

FIG. 7A is a sequence chart showing message examples when the first communication apparatus 10 performs HTTP communication disconnection from the second communication apparatus 20, and shows details of step M603 describe above.

In step M901, the first communication apparatus 10 transmits a GOAWAY frame complying with HTTP/2 to the second communication apparatus 20. In step M902 (M903 to M905), the first communication apparatus 10 performs TCP communication disconnection from the second communication apparatus 20. More specifically, in step M903, the first communication apparatus 10 transmits a TCP disconnection request (FIN frame) to the second communication apparatus 20. In step M904, the second communication apparatus 20 transmits a TCP disconnection request response (FIN/ACK frame) to the first communication apparatus 10. In step M905, the first communication apparatus 10 transmits a response (ACK frame) to the second communication apparatus 20.

Wireless LAN Communication Connection Sequence (M501)

Figure 7B:
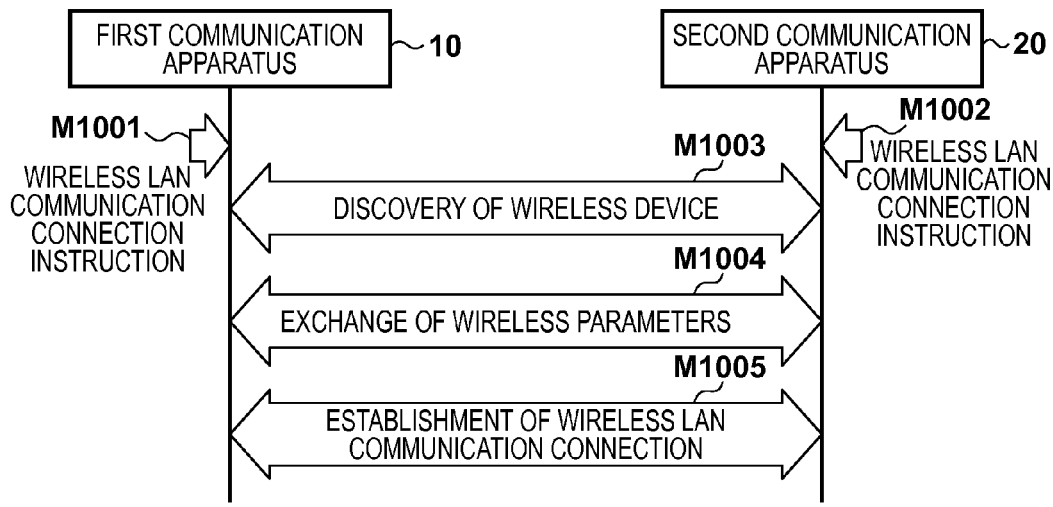

FIG. 7B is a sequence chart showing message examples when the first communication apparatus 10 performs HTTP communication connection to the second communication apparatus 20, and shows details of step M501 describe above.

In step M1001, the first communication apparatus 10 detects a wireless LAN communication connection instruction from the user. The wireless LAN communication connection instruction from the user is issued upon, for example, pressing of a WPS push button. The present invention is not limited to this, and another wireless LAN communication connection instruction such as a Wi-Fi Direct® connection instruction may be issued.

In step M1002, the second communication apparatus 20 detects a wireless LAN communication connection instruction from the user for the first communication apparatus 10. This detection method is the same as that in step M1001.

In step M1003, the first communication apparatus 10 discovers wireless LAN communication of the second communication apparatus 20. In step M1004, the first communication apparatus 10 exchanges wireless parameters with the second communication apparatus 20. In step M1005, the first communication apparatus 10 establishes a wireless LAN communication connection to the second communication apparatus 20.

Wireless LAN Communication Disconnection Sequence (M508)

Figure 7C:
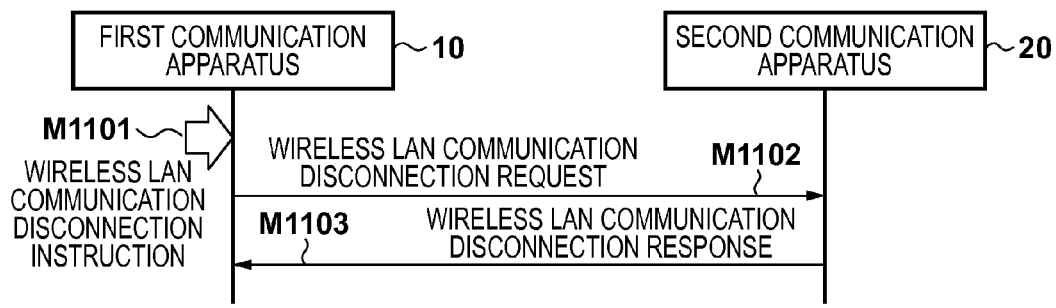

FIG. 7C is a sequence chart showing message examples when the first communication apparatus 10 performs HTTP communication disconnection from the second communication apparatus 20, and shows details of step M508 describe above.

In step M1101, the first communication apparatus 10 detects a wireless LAN communication disconnection instruction from the user. In step M1102, the first communication apparatus 10 transmits a wireless LAN communication disconnection request to the second communication apparatus 20. In step M1103, the second communication apparatus 20 transmits a wireless LAN communication disconnection response to the first communication apparatus 10.

HTTP Header Table Selection Sequence (M502, M505)

Figure 8A:
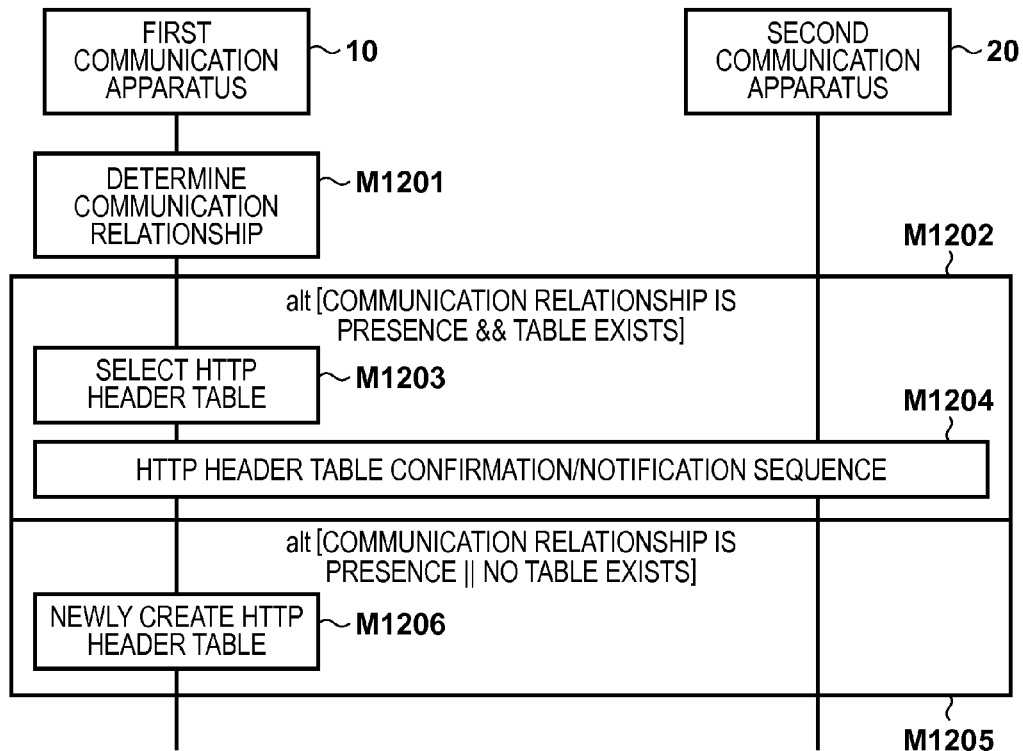
FIGS. 8A and 8B are sequence charts respectively showing message examples when the first communication apparatus performs HTTP header table selection processing, and confirmation and notification processing of the selected HTTP header table.

FIG. 8A is a sequence chart showing message examples when the first communication apparatus 10 selects an HTTP header table with the second communication apparatus 20, and shows details of steps M502 and M505 described above.

First, in step M1201, the first communication apparatus 10 determines a communication relationship with the second communication apparatus 20.

If it is determined in step M1201 that a communication relationship with the second communication apparatus 20 is present and an HTTP header table for the second communication apparatus 20 exists, the processing in step M1202 (M1203 and M1204) is performed. That is, in step M1203, the first communication apparatus 10 selects an HTTP header table corresponding to the communication relationship with the second communication apparatus 20. In step M1204, the first communication apparatus 10 performs confirmation and notification of the selected HTTP header table with the second communication apparatus 20. Details of this HTTP header table confirmation/notification processing will be described later with reference to FIG. 8B.

If it is determined in step M1201 that there is no communication relationship between the first communication apparatus 10 and the second communication apparatus 20 or there is no HTTP header table for the second communication apparatus 20, an initial table is created in step M1205 (M1206). That is, in step M1206, the first communication apparatus 10 newly creates an initial HTTP header table defined by the HTTP/2 method.

HTTP Header Table Confirmation/Notification Sequence (M1204)

Figure 8B:
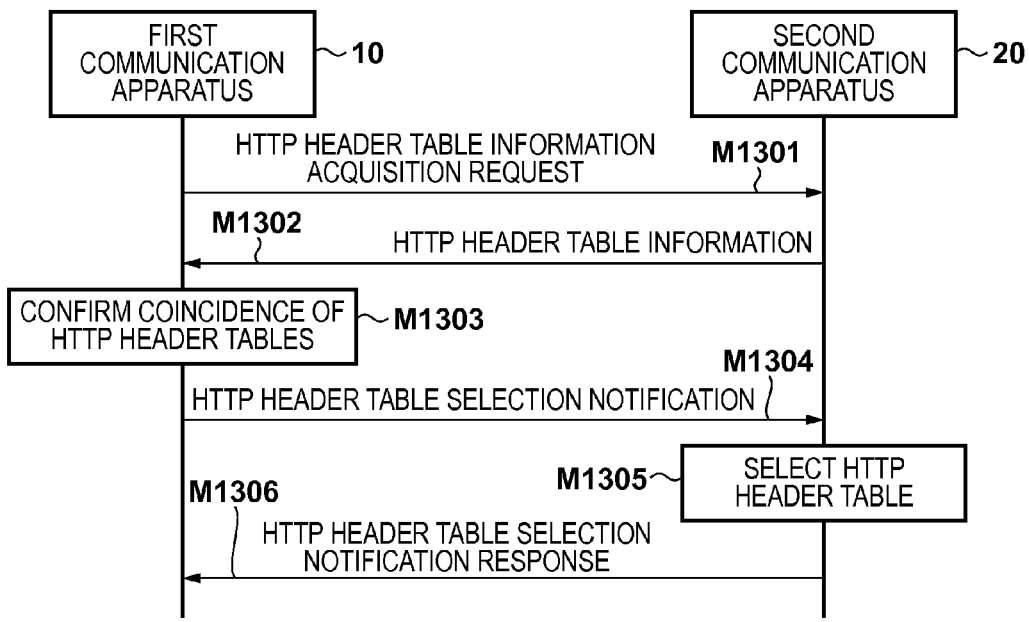

FIG. 8B is a sequence chart showing message examples when the first communication apparatus 10 performs confirmation and notification of the selected HTTP header table with the second communication apparatus 20, and shows details of step M1204 described above.

In step M1301, the first communication apparatus 10 transmits an HTTP header table information acquisition request to the second communication apparatus 20. In step M1302, the second communication apparatus 20 transmits HTTP header table information to the first communication apparatus 10. In step M1303, based on the HTTP header table information acquired in step M1302, the first communication apparatus 10 confirms whether the selected HTTP header table coincides with an HTTP header table based on the acquired information. That is, it is confirmed whether the second communication apparatus 20 holds the same HTTP header table as that selected by the first communication apparatus 10.

In step M1304, the first communication apparatus 10 notifies the second communication apparatus 20 of the selected HTTP header table. Then, in step M1305, the second communication apparatus 20 selects the HTTP header table notified from the first communication apparatus 10. In step M1306, the second communication apparatus 20 transmits the notification response of the selected HTTP header table to the first communication apparatus 10.

HTTP Header Table Deletion Sequence (M504, M507, M509)

FIG. 9 is a sequence chart showing message examples when the first communication apparatus 10 deletes the HTTP header table used with the second communication apparatus 20, and shows details of steps M504, M507, and M509 described above.

First, in step M1401, the first communication apparatus 10 detects a communication event with the second communication apparatus 20. The communication event is, for example, an HTTP communication disconnection event, a wireless LAN communication disconnection event, or the like.

In step M1402, the first communication apparatus 10 determines the communication relationship with the second communication apparatus 20. If the presence of the communication relationship with the second communication apparatus 20 is determined in step M1402, processing in step M1403 (M1404) is performed. That is, in step M1404, the first communication apparatus 10 stores the HTTP header table used for HTTP communication with the second communication apparatus 20. On the other hand, if the absence of the communication relationship with the second communication apparatus 20 is determined in step M1402, processing in step M1405 (M1406) is performed. That is, in step M1406, the first communication apparatus 10 deletes the HTTP header table used for HTTP communication with the second communication apparatus 20.

In step M1407, the second communication apparatus 20 detects a communication event with the first communication apparatus 10. The communication event is also, for example, an HTTP communication disconnection event, a wireless LAN communication disconnection event, or the like.

In step M1408, the second communication apparatus 20 determines the communication relationship with the first communication apparatus 10. If the presence of the communication relationship with the first communication apparatus 10 is determined in step M1408, processing in step M1409 (M1410) is performed. That is, in step M1410, the second communication apparatus 20 stores the HTTP header table used for HTTP communication with the first communication apparatus 10. On the other hand, if the absence of the communication relationship with the first communication apparatus 10 is determined in step M1408, processing in step M1411 (M1412) is performed. That is, in step M1412, the second communication apparatus 20 deletes the HTTP header table used for HTTP communication with the first communication apparatus 10.

Communication Processing

Communication processing between the first communication apparatus 10 and the second communication apparatus 20 according to this embodiment will be described in detail below with reference to the function module arrangement shown in FIG. 2.

HTTP Header Table Selection Processing

Figure 10:
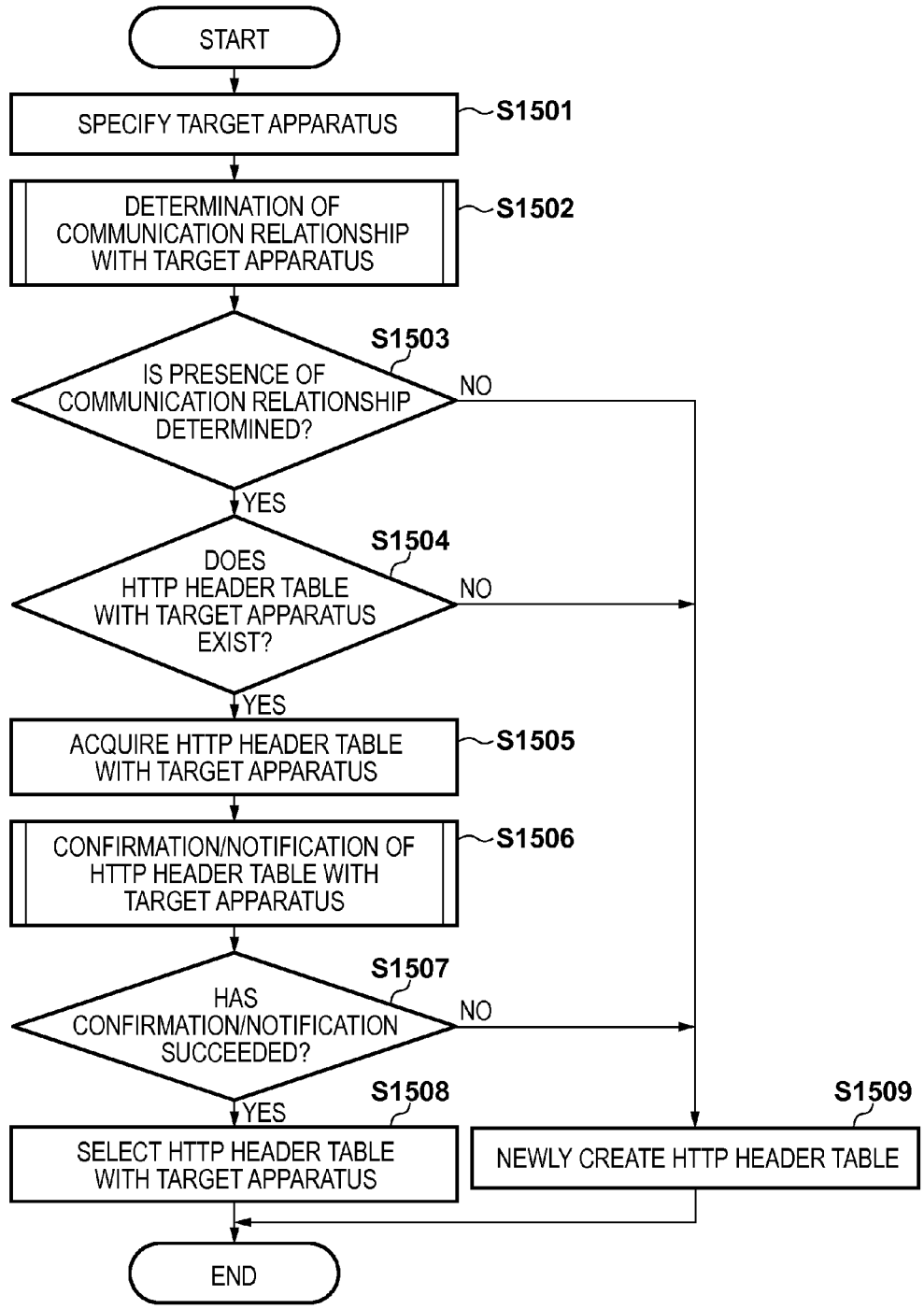
FIG. 10 is a flowchart illustrating the operation procedure of HTTP header table selection processing by the first communication apparatus.

FIG. 10 is a flowchart illustrating an operation procedure in which the first communication apparatus 10 selects an HTTP header table with the second communication apparatus 20.

In step S1501, the HTTP header table selection unit 320 specifies an apparatus (to be referred to as a target apparatus hereinafter) as a communication target by using the HTTP communication controller 307. In this example, the target apparatus is the second communication apparatus 20. In step S1502, the communication relationship determination unit 311 determines the presence/absence of a communication relationship as a connection status with the target apparatus. Details of this determination processing will be described later with reference to FIG. 11.

If the presence of the communication relationship with the target apparatus is determined (S1503; YES), the process advances to step S1504; otherwise (S1503; NO), the process advances to step S1509. The absence of the communication relationship indicates that HTTP communication connection to the target apparatus has not been performed yet.

In step S1504, the HTTP header table selection unit 320 determines whether there is an HTTP header table for the communication relationship with the target apparatus in the HTTP header table storage unit 318. If there exists the HTTP header table (S1504; YES), the process advances to step S1505; otherwise (S1504; NO), the process advances to step S1509.

In step S1505, the HTTP header table selection unit 320 acquires the HTTP header table for the communication relationship with the target apparatus from the HTTP header table storage unit 318. In step S1506, the HTTP header table confirmation unit 321 performs, with the target apparatus, confirmation and notification of the HTTP header table acquired in step S1505. Details of the HTTP header table confirmation/notification processing will be described later with reference to FIG. 12. If the confirmation and notification processing in step S1506 has succeeded (S1507; YES), the process advances to step S1508; otherwise (S1507; NO), the process advances to step S1509.

In step S1508, the HTTP header table selection unit 320 selects the HTTP header table acquired in step S1505 to be used by the HTTP header compression unit 315 for HTTP header compression with the target apparatus, thereby terminating the process.

In step S1509, the HTTP header table generation unit 316 newly generates an initial HTTP header table defined by the HTTP/2 method. Then, the HTTP header table selection unit 320 selects the newly generated HTTP header table to be used by the HTTP header compression unit 315 for HTTP header compression with the target apparatus, thereby terminating the process.

Communication Relationship Determination Processing (S1502)

Figure 11:
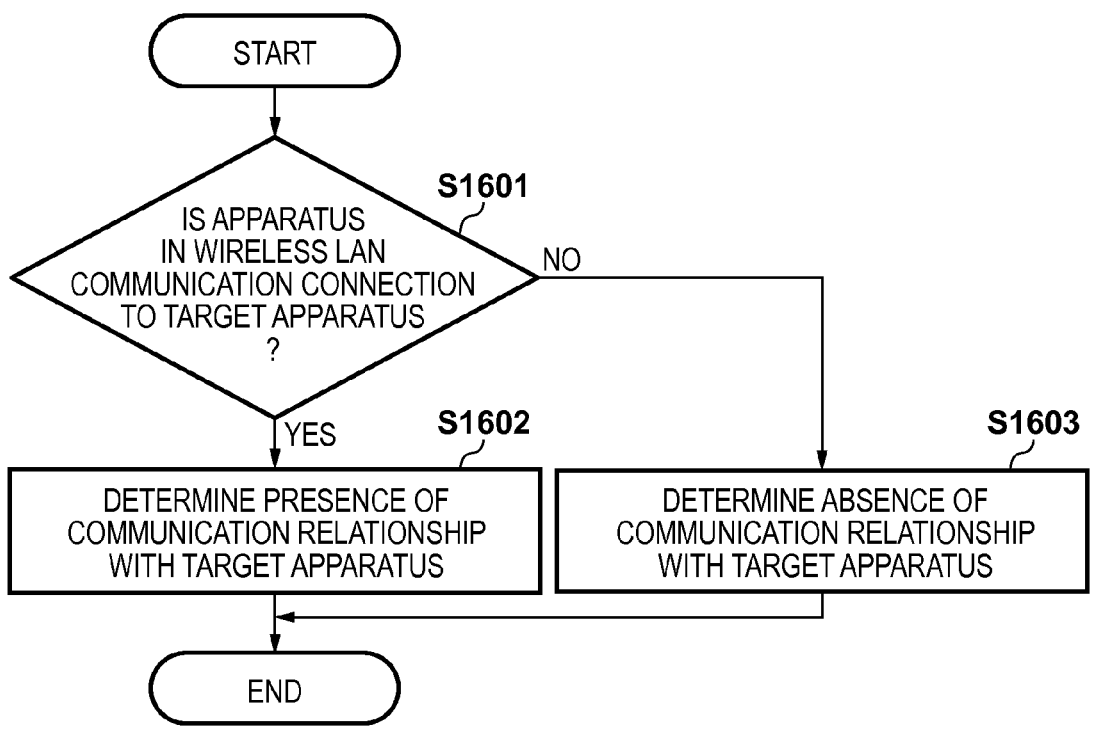
FIG. 11 is a flowchart illustrating the operation procedure of communication relationship determination processing by the first communication apparatus.

FIG. 11 is a flowchart illustrating processing of determining the presence/absence of the communication relationship with the second communication apparatus 20 by the first communication apparatus 10, and shows details of step S1502 described above.

In step S1601, the communication state determination unit 312 determines whether the apparatus is in wireless LAN communication connection to the target apparatus. If the apparatus is in wireless LAN communication connection to the target apparatus (S1601; YES), the process advances to step S1602; otherwise (S1601; NO), the process advances to step S1603.

In step S1602, based on the determination result of the communication state determination unit 312, the communication relationship determination unit 311 determines the presence of the communication relationship with the target apparatus, thereby terminating the process. On the other hand, in step S1603, based on the determination result of the communication state determination unit 312, the communication relationship determination unit 311 determines the absence of the communication relationship with the target apparatus, thereby terminating the process.

HTTP Header Table Confirmation/Notification Processing (S1506; First Communication Apparatus)

FIG. 12A is a flowchart illustrating the confirmation and notification processing of the HTTP header table selected by the first communication apparatus 10 with the second communication apparatus 20, and shows details of step S1506 described above.

In step S1701, the HTTP header table confirmation unit 321 transmits an HTTP header table information acquisition request to the target apparatus. The HTTP header table information is information by which it is possible to determine whether HTTP header tables coincide with each other, such as a CRC calculated based on data of the HTTP header table.

If the HTTP header table confirmation unit 321 receives the HTTP header table information from the target apparatus in step S1702 (S1702; YES), the process advances to step S1703; otherwise (S1702; NO), the process advances to step S1707.

In step S1703, the HTTP header table confirmation unit 321 determines whether the HTTP header table acquired in step S1505 coincides with the HTTP header table based on the HTTP header table information of the target apparatus received in step S1702. If it is determined that the tables coincide with each other (S1703; YES), the process advances to step S1704; otherwise (S1703; NO), the process advances to step S1707.

In step S1704, the HTTP header table confirmation unit 321 notifies the target apparatus of HTTP header table selection acquired in step S1505. The information transmitted in this notification processing may be any information by which it is possible to identify the HTTP header table.

In step S1705, the HTTP header table confirmation unit 321 determines whether an HTTP header table selection notification response has been received from the target apparatus. If the response has been received (S1705; YES), the process advances to step S1706; otherwise (S1705; NO), the process advances to step S1707.

In step S1706, the HTTP header table confirmation unit 321 determines whether the HTTP header selection notification response received from the target apparatus has succeeded. If the response has succeeded (S1706; YES), the process ends; otherwise (S1706; NO), the process advances to step S1707.

In step S1707, the HTTP header table confirmation unit 321 determines that confirmation of the HTTP header table has failed, thereby terminating the process.

HTTP Header Table Confirmation/Notification Processing (S1506; Second Communication Apparatus)

FIG. 12B is a flowchart illustrating processing of receiving, by the second communication apparatus 20, the HTTP header table selection notification from the first communication apparatus 10, and shows details of step S1506.

In step S1801, the HTTP header table confirmation unit 321 receives the HTTP header table selection notification from the first communication apparatus 10.

In step S1802, the HTTP header table confirmation unit 321 determines whether the HTTP header table designated by the notification in step S1801 exists in the HTTP header table storage unit 318. If the HTTP header table exists (S1802; YES), the process advances to step S1803; otherwise (S1802; NO), the process advances to step S1805.

In step S1803, the HTTP header table selection unit 320 selects the HTTP header table, designated by the notification in step S1801, to be used for HTTP header compression with the first communication apparatus 10. In step S1804, the HTTP header table confirmation unit 321 transmits "success" as an HTTP header table selection notification response, thereby terminating the process. On the other hand, in step S1805, the HTTP header table confirmation unit 321 transmits "failure" as an HTTP header table selection notification response, thereby terminating the process.

HTTP Request Processing (FIG. 6; First Communication Apparatus)

Figure 13:
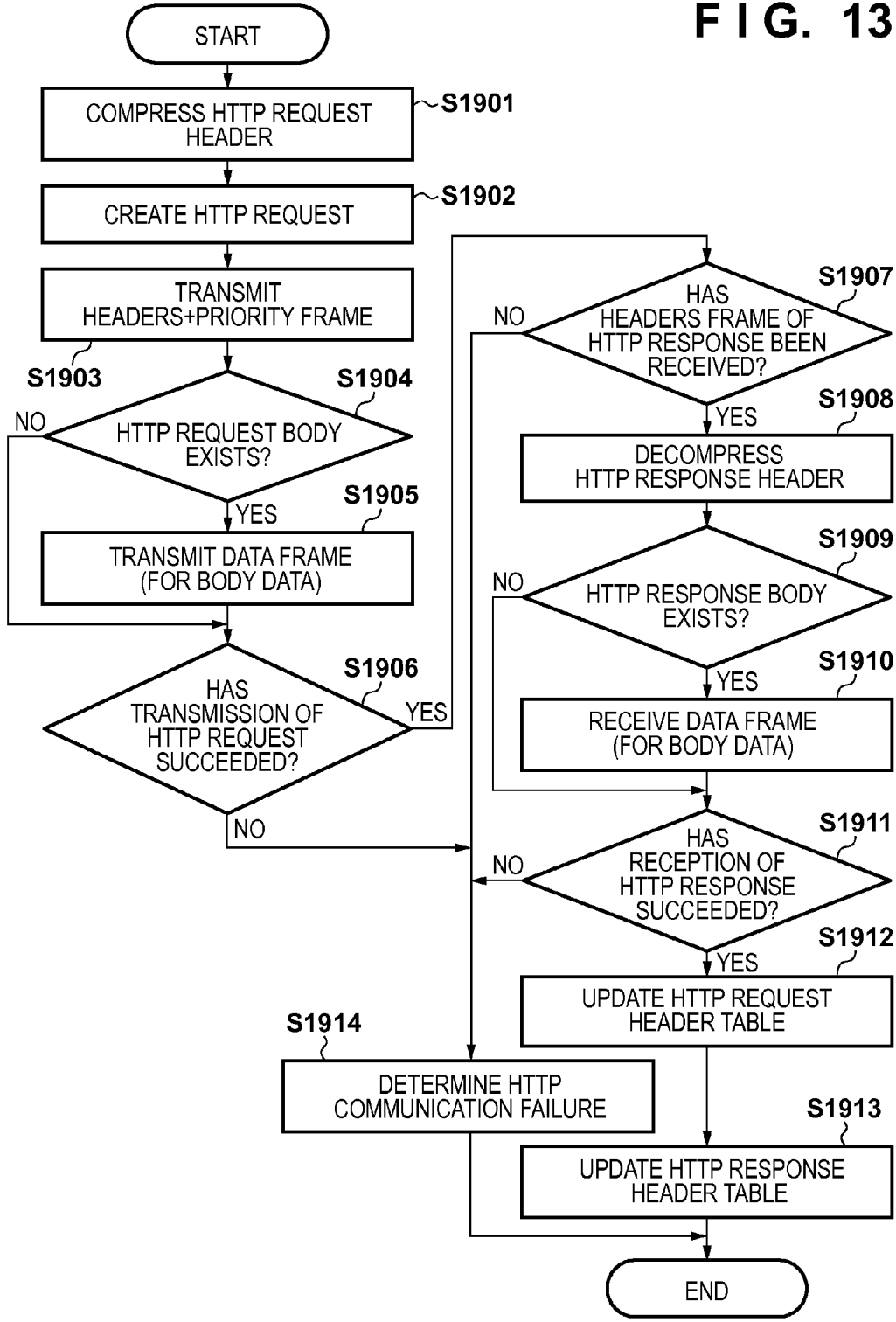
FIG. 13 is a flowchart illustrating an operation procedure of transmitting an HTTP request and receiving an HTTP response by the first communication apparatus.

FIG. 13 is a flowchart illustrating processing in which the first communication apparatus 10 transmits an HTTP request to the second communication apparatus 20, and receives an HTTP response from the second communication apparatus 20.

In step S1901, the HTTP header compression unit 315 compresses an HTTP request header using the HTTP header table with the target apparatus acquired in step S1505. In step S1902, the HTTP communication controller 307 creates an HTTP request to include the compressed HTTP request header. In step S1903, the HTTP communication controller 307 transmits a HEADERS+PRIORITY frame to the target apparatus. This frame contains information of the HTTP request header compressed in step S1901.

In step S1904, the HTTP communication controller 307 determines whether an HTTP request body exists in the HTTP request created in step S1902. If the HTTP request body exists (S1904; YES), the process advances to step S1905; otherwise (S1904; NO), the process advances to step S1906. In step S1905, the HTTP communication controller 307 transmits a DATA frame to the target apparatus. This frame contains information of the HTTP request body created in step S1902. The HTTP communication controller 307 repeatedly transmits a DATA frame by the size of the HTTP request body data, and sets a FINAL flag in the last DATA frame.

In step S1906, the HTTP communication controller 307 determines whether transmission of the HTTP request to the target apparatus has succeeded. If transmission has succeeded (S1906; YES), the process advances to step S1907; otherwise (S1906; NO), the process advances to step S1914.

In step S1907, the HTTP communication controller 307 determines whether a HEADERS frame of an HTTP response has been received from the target apparatus. If the HEADERS frame has been received (S1907; YES), the process advances to step S1908; otherwise (S1907; NO), the process advances to step S1914. In step S1908, the HTTP header compression unit 315 decompresses a compressed HTTP response header contained in the received HEADERS frame using the HTTP header table with the target apparatus.

In step S1909, the HTTP communication controller 307 determines whether an HTTP response body exists in the HTTP response received from the target apparatus. If the HTTP response body exists (S1909; YES), the process advances to step S1910; otherwise (S1909; NO), the process advances to step S1911. In step S1910, the HTTP communication controller 307 receives a DATA frame from the target apparatus. This frame contains information of the HTTP response body. The HTTP communication controller 307 repeatedly receives a DATA frame by the size of the HTTP response body data.

In step S1911, the HTTP communication controller 307 determines whether reception of the HTTP response from the target apparatus has succeeded. If reception has succeeded (S1911; YES), the process advances to step S1912; otherwise (S1911; NO), the process advances to step S1914. In step S1912, the HTTP header table update unit 317 updates the HTTP request header table with the target apparatus based on the HTTP request header created in steps S1901 and S1902. In step S1913, the HTTP header table update unit 317 updates the HTTP response header table with the target apparatus based on the HTTP response header received in step S1907, thereby terminating the process.

In step S1914, the HTTP communication controller 307 determines that HTTP communication with the target apparatus has failed, thereby terminating the process.

HTTP Response Processing (FIG. 6; Second Communication Apparatus)

Figure 14:
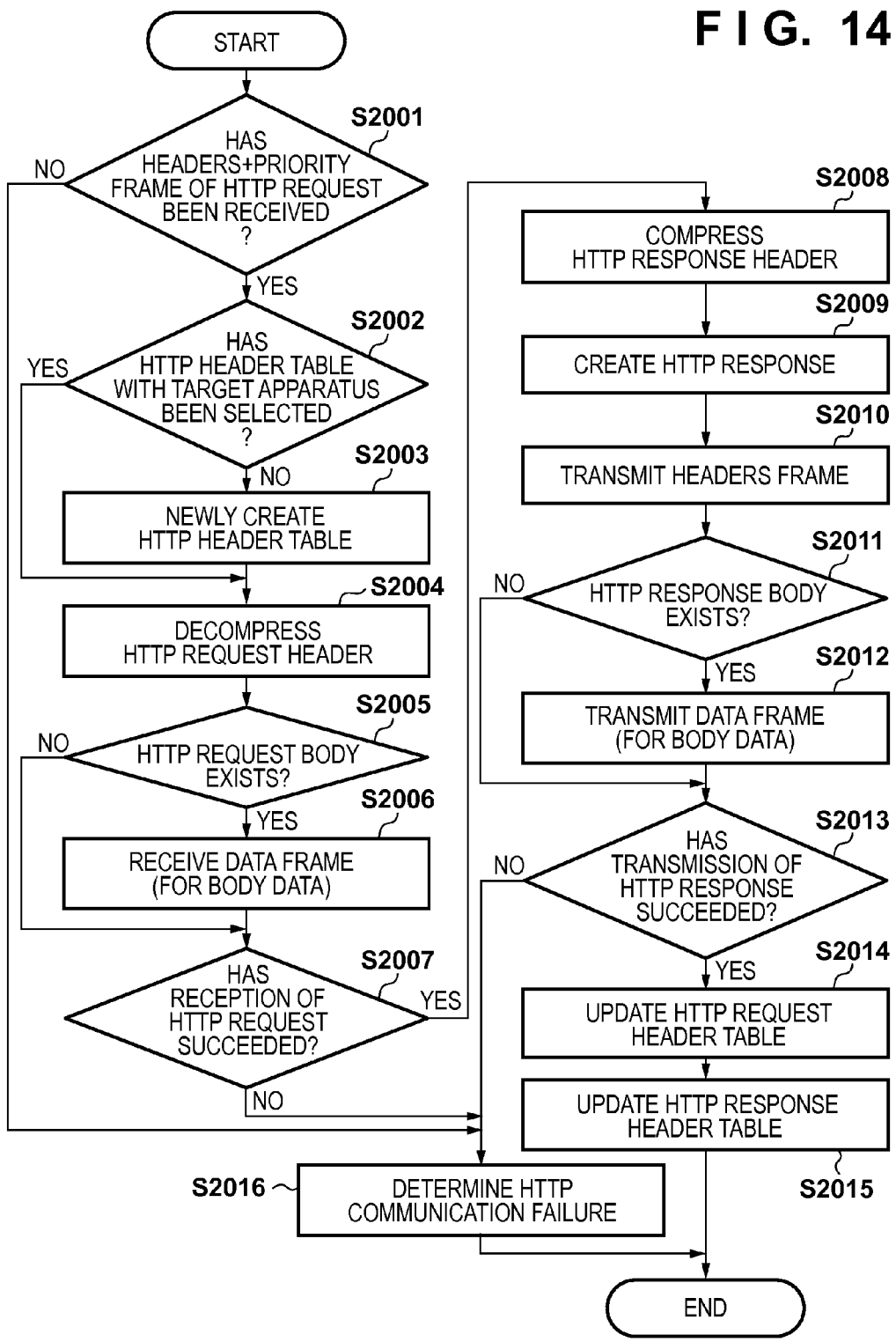
FIG. 14 is a flowchart illustrating an operation procedure of receiving an HTTP request and transmitting an HTTP response by the second communication apparatus.

FIG. 14 is a flowchart illustrating processing in which the second communication apparatus 20 receives the HTTP request from the first communication apparatus 10 and transmits the HTTP response to the first communication apparatus 10. Note that in this processing, the target apparatus is the first communication apparatus 10.

In step S2001, the HTTP communication controller 307 determines whether the HEADERS+PRIORITY frame of the HTTP request has been received from the target apparatus. If the HEADERS+PRIORITY frame has been received (S2001; YES), the process advances to step S2002; otherwise (S2001; NO), the process advances to step S2016.

In step S2002, the HTTP header table selection unit 320 determines whether an HTTP header table with the target apparatus has been selected. If an HTTP header table has been selected (S2002; YES), the process advances to step S2004; otherwise (S2002; NO), the process advances to step S2003. In step S2003, the HTTP header table generation unit 316 newly generates an initial HTTP header table defined by the HTTP/2 method. At this time, the HTTP header table selection unit 320 selects the newly generated HTTP header table to be used by the HTTP header compression unit 315 for HTTP header compression with the target apparatus.

In step S2004, the HTTP header compression unit 315 decompresses a compressed HTTP request header included in the received HEADERS+PRIORITY frame by using the HTTP header table with the target apparatus.

In step S2005, the HTTP communication controller 307 determines whether an HTTP request body exists in the HTTP request received from the target apparatus. If the HTTP request body exists (S2005; YES), the process advances to step S2006; otherwise (S2005; NO), the process advances to step S2007. In step S2006, the HTTP communication controller 307 receives the DATA frame from the target apparatus. This frame contains information of the HTTP request body. The HTTP communication controller 307 repeatedly receives the DATA frame by the size of the HTTP request body data.

In step S2007, the HTTP communication controller 307 determines whether reception of the HTTP request from the target apparatus has succeeded. If reception has succeeded (S2007; YES), the process advances to step S2008; otherwise (S2007; NO), the process advances to step S2016.

In step S2008, the HTTP header compression unit 315 compresses an HTTP response header using the HTTP header table with the target apparatus selected in step S1803 or S2003. In step S2009, the HTTP communication controller 307 creates an HTTP response to include the HTTP response header compressed in step S2008. In step S2010, the HTTP communication controller 307 transmits a HEADERS frame to the target apparatus. This frame contains information of the HTTP response header compressed in step S2008.

In step S2011, the HTTP communication controller 307 determines whether an HTTP response body exists in the HTTP response created in step S2009. If the HTTP response body exists (S2011; YES), the process advances to step S2012; otherwise (S2011; NO), the process advances to step S2013. In step S2012, the HTTP communication controller 307 transmits a DATA frame to the target apparatus. This frame includes information of the HTTP response body created in step S2009. The HTTP communication controller 307 repeatedly transmits a DATA frame by the size of the HTTP response body data, and sets a FINAL flag in the last DATA frame.

In step S2013, the HTTP communication controller 307 determines whether transmission of the HTTP response to the target apparatus has succeeded. If transmission has succeeded (S2013; YES), the process advances to step S2014; otherwise (S2013; NO), the process advances to step S2016. In step S2014, the HTTP header table update unit 317 updates the HTTP request header table with the target apparatus based on the HTTP request header received in step S2001. In step S2015, the HTTP header table update unit 317 updates the HTTP response header table with the target apparatus based on the HTTP response header created in steps S2008 and S2009, thereby terminating the process.

In step S2016, the HTTP communication controller 307 determines that HTTP communication with the target apparatus has failed, thereby terminating the process.

HTTP Header Table Deletion Processing (FIG. 9)

Figure 15:
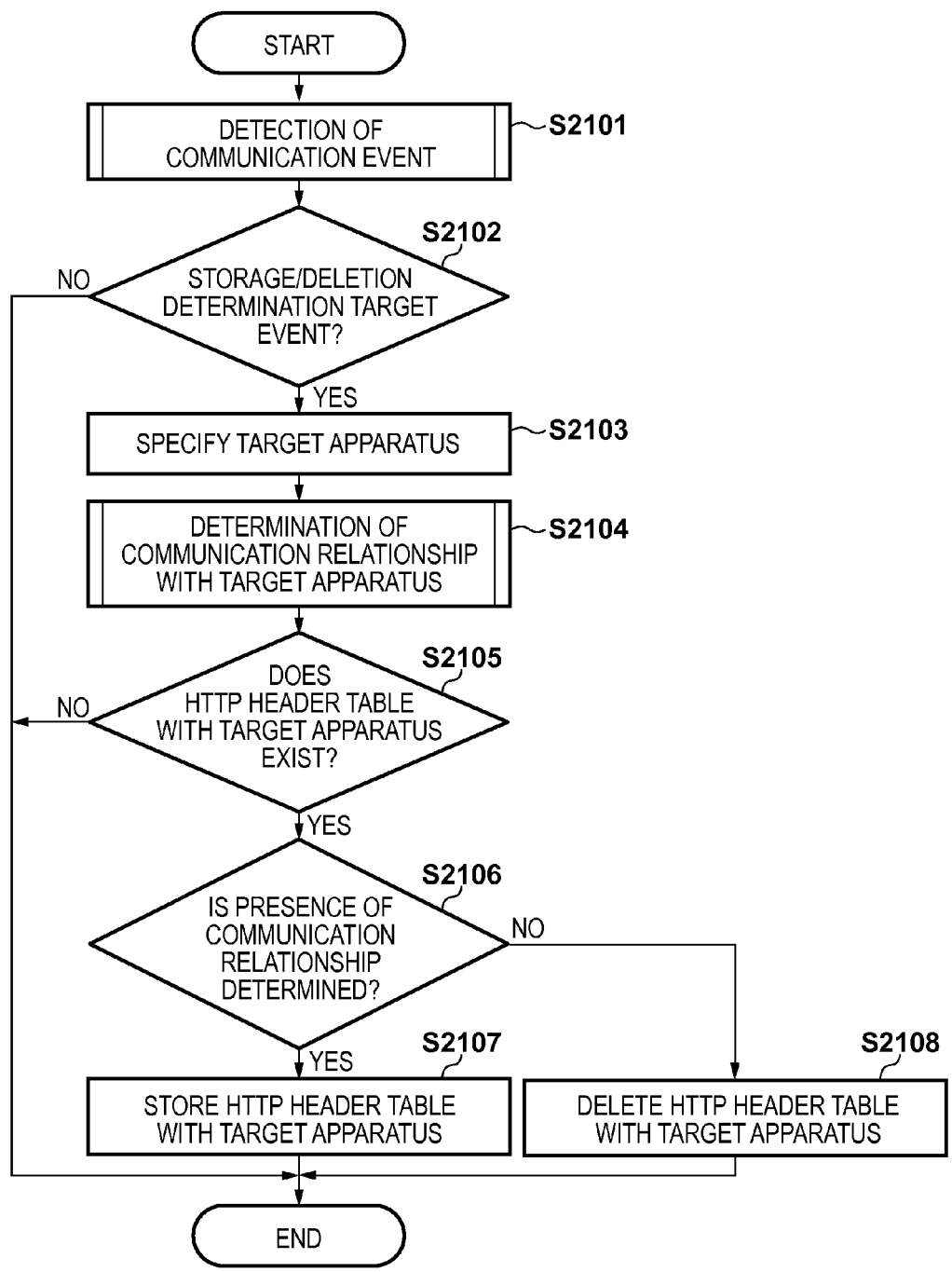
FIG. 15 is a flowchart illustrating an operation procedure of storing or deleting an HTTP header table by the first communication apparatus.

FIG. 15 is a flowchart illustrating processing of storing or deleting, by the first communication apparatus 10, the HTTP header table used with the second communication apparatus 20.

In step S2101, by using the communication relationship determination unit 311, the HTTP header table selection unit 320 detects a communication event for determining to store or delete the HTTP header table. Details of this detection processing will be described later with reference to FIG. 16.

In step S2102, the HTTP header table selection unit 320 determines whether the communication event detected in step S2101 is a storage/deletion determination target event. If the communication event is a target event (S2102; YES), the process advances to step S2103; otherwise (S2102; NO), the process ends. In step S2103, the HTTP header table selection unit 320 specifies a target apparatus as an HTTP header table storage or deletion target. Note that the target apparatus is the second communication apparatus 20 in this example. In step S2104, the communication relationship determination unit 311 determines the presence/absence of the communication relationship with the target apparatus. Details of this determination processing are as described above with reference to FIG. 11, similarly to step S1502.

In step S2105, the HTTP header table selection unit 320 determines whether the HTTP header table for the communication relationship with the target apparatus exists in the HTTP header table storage unit 318. If the HTTP header table exists (S2105; YES), the process advances to step S2106; otherwise (S2105; NO), the process ends.

In step S2106, the communication relationship determination unit 311 determines the presence/absence of the communication relationship with the target apparatus. If the presence of the communication relationship is determined (S2106; YES), the process advances to step S2107; otherwise (S2106; NO), the process advances to step S2108. In step S2107, the HTTP header table storage unit 318 keeps, in itself, the HTTP header table for the communication relationship with the target apparatus, thereby terminating the process. On the other hand, in step S2108, the HTTP header table deletion unit 319 deletes the HTTP header table for the communication relationship with the target apparatus, thereby terminating the process.

Communication Event Detection Processing (S2101)

Figure 16:
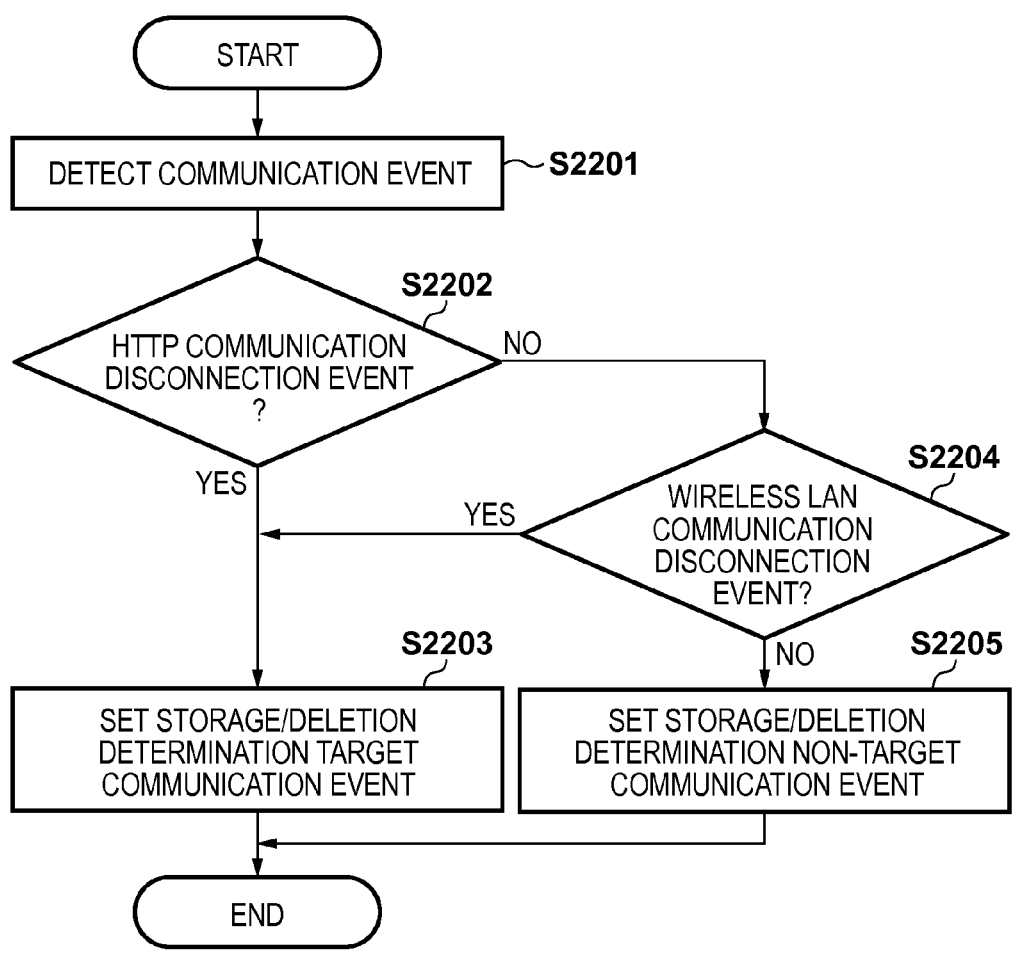
FIG. 16 is a flowchart illustrating the operation procedure of communication event detection processing by the first communication apparatus.

FIG. 16 is a flowchart illustrating processing of detecting, by the first communication apparatus 10, a communication event for determining to store or delete the HTTP header table used with the second communication apparatus 20.

In step S2201, the communication relationship determination unit 311 detects a communication event. At this time, the communication relationship determination unit 311 uses one of the wireless LAN communication controller 302, TCP/IP communication controller 306, HTTP communication controller 307, discovery controller 308, authentication controller 309, and service controller 310.

In step S2202, the communication relationship determination unit 311 determines whether the detected communication event is an event of HTTP communication disconnection from the target apparatus. If the detected communication event is an HTTP communication disconnection event (S2202; YES), the process advances to step S2203; otherwise (S2202; NO), the process advances to step S2204. In step S2203, the HTTP header table selection unit 320 sets the detected communication event as a storage/deletion determination target communication event, thereby terminating the process.

In step S2204, the communication relationship determination unit 311 determines whether the detected communication event is an event of wireless LAN communication disconnection from the target apparatus. If the detected communication event is a wireless LAN communication disconnection event (S2204; YES), the process advances to step S2203; otherwise (S2204; NO), the process advances to step S2205. In step S2205, the HTTP header table selection unit 320 sets the detected communication event as a storage/deletion determination non-target communication event, thereby terminating the process.

HTTP Header Table

HTTP header table update processing according to this embodiment will be described below with reference to a practical example. FIG. 24A is a table showing a practical example of the initial HTTP header table according to this embodiment. Referring to FIG. 24A, in the HTTP request header table 3410, the HTTP request header names 3412 and HTTP request header values 3413 of the indices 3411 "0" to "37" are set as initial records. Similarly, in the HTTP response header table 3420, the HTTP response header names 3422 and HTTP response header values 3423 of the indices 3421 "0" to "34" are set as initial records.

FIG. 24B is a table showing a practical example of the updated HTTP header table according to this embodiment. Referring to FIG. 24B, in addition to initial records of indices 3511 "0" to "37", a record (header name: x-my-header, header value: first) of an index "38" is added to an HTTP request header table 3510. Similarly, in addition to initial records of indices 3521 "0" to "34", a record (header name: x-my-header, header value: first) of an index "35" is added to an HTTP response header table 3520.

As described above, according to this embodiment, the first communication apparatus 10 appropriately selects an HTTP header table to be used for HTTP communication with the second communication apparatus 20 in accordance with a communication relationship with the second communication apparatus 20. Thus, the first communication apparatus 10 need not newly create an HTTP header table every time HTTP communication with the second communication apparatus 20 starts, thereby reducing the processing load of HTTP header table creation processing and a communication delay caused by the creation time.

As shown in FIG. 15, when the first communication apparatus 10 determines the presence of the communication relationship with the second communication apparatus 20, it stores the HTTP header table used with the second communication apparatus 20. Consequently, when communication with the second communication apparatus 20 continues and HTTP communication is performed again at a high probability, the first communication apparatus 10 allows reuse of the HTTP header table by storing it. This further reduces the processing load of HTTP header table creation processing and the communication delay caused by the creation time.

On the other hand, as shown in FIG. 15, when the first communication apparatus 10 determines the absence of the communication relationship with the second communication apparatus 20, it deletes the HTTP header table used with the second communication apparatus 20. Consequently, if communication with the second communication apparatus 20 does not continue and HTTP communication is performed again at a low probability, the first communication apparatus 10 can delete the stored HTTP header table. This eliminates the need to unnecessarily store the HTTP header table which is not to be reused, thereby reducing the consumption of a memory area. Furthermore, it is possible to further reduce the processing load of appropriate HTTP header table selection processing and a communication delay caused by the selection processing in the HTTP header table selection unit 320.

Also, a case in which the communication relationship determination unit 311 detects an HTTP communication disconnection event using the HTTP communication controller 307 in step S2202 of FIG. 16 has been exemplified. HTTP communication disconnection detection according to the present invention is not limited to this. For example, if power-off, wireless LAN communication disconnection, or the like occurs during HTTP communication in the first communication apparatus 10 and the second communication apparatus, it may be impossible to detect a communication event of HTTP communication disconnection. In this case, an HTTP header table which should originally be deleted is not deleted to unnecessarily consume the memory area. To cope with this situation, the communication relationship determination unit 311 may detect HTTP communication connection using the HTTP communication controller 307. In this case, that is, at the start of communication, the processing shown in FIG. 15 is executed to determine whether to delete the HTTP header table which is not to be reused, thereby further reducing the consumption of the memory area. Also, it is possible to further reduce the processing load of the HTTP header table selection unit 320 and a communication delay caused by selection processing.

FIG. 8B has exemplified a case in which the first communication apparatus 10 performs confirmation and notification of the HTTP header table selected with the second communication apparatus 20 before the HTTP communication sequence. The present invention, however, is not limited to this, and the confirmation and notification processing may be performed during the HTTP communication sequence. For example, the first communication apparatus 10 may designate information of the selected HTTP header table in the HEADERS+PRIORITY frame in step M804 of FIG. 6, thereby notifying the second communication apparatus 20 of it. This can reduce the HTTP header table confirmation/notification sequence shown in FIG. 8B between the first communication apparatus 10 and the second communication apparatus 20, thereby increasing the communication speed between the first communication apparatus 10 and the second communication apparatus 20, and reducing the power consumption.

In step S1504 of FIG. 10, the HTTP header table selection unit 320 may select one of a plurality of HTTP header tables which are stored in the HTTP header table storage unit 318 and correspond to the target apparatus. In this case, in step S2107 of FIG. 15, the HTTP header table storage unit 318 stores information of a communication relationship in an HTTP header table use status in association with the HTTP header table used with the target apparatus. The information of the communication relationship need only be information by which it is possible to identify each communication relationship, such as a communication history (date, time, IP address, packet data, communication contents, communication state, connection relationship, and the like). This enables the HTTP header table selection unit 320 to select an optimum one of the HTTP header tables used with the second communication apparatus 20, thereby improving the header compression efficiency.

A case in which the communication state determination unit 312 determines the presence/absence of the communication relationship based on HTTP communication and wireless LAN communication states has been exemplified, as shown in FIG. 11. The present invention, however, is not limited to this. The determination processing can be performed as follows.

For example, the communication state determination unit 312 may use the TCP/IP communication controller 306 to determine the presence/absence of the communication relationship based on the TCP/IP communication state with the second communication apparatus 20. At this time, the presence of the communication relationship is determined during TCP connection, and the absence of the communication relationship is determined during TCP disconnection. As will be described later in the third embodiment, the discovery controller 308 may be used to determine the presence/absence of the communication relationship based on a discovery state with the second communication apparatus 20 on the wireless LAN.

Also, the authentication controller 309 may be used to determine the presence/absence of the communication relationship based on the authentication state with the second communication apparatus 20. For example, the presence of the communication relationship is determined in the user login state, the authenticated state, the permitted state, the state in which the authentication valid period has not expired, the access token valid state, the state in which the access token valid period has not expired, or the like. On the other hand, the absence of the communication relationship is determined in the user logout state, the unauthenticated state, the unpermitted state, the state in which the authentication valid period has expired, the access token invalid state, the state in which the access token valid period has expired, or the like.

The service controller 310 may be used to determine the presence/absence of the communication relationship based on the service provision/used state with the second communication apparatus 20. At this time, the presence of the communication relationship is determined at the start of provision or use of a service, and the absence of the communication relationship is determined at the end of provision or use of the service.

The communication state determination unit 312 may determine the presence/absence of the communication relationship based on a combination of the plurality of communication states.

Second Embodiment

The second embodiment of the present invention will be described below. According to a feature of the second embodiment, a communication relationship is determined based on the communication states of a plurality of HTTP communication operations (HTTP multi-session communication). A communication system configuration and function module arrangement according to the second embodiment are the same as those in the above-described first embodiment and a description thereof will be omitted.

Communication Sequence (Mainstream)

A communication sequence between a first communication apparatus 10 and a second communication apparatus 20 according to the second embodiment will be described in detail below.

FIG. 17 is a sequence chart showing message examples when the first communication apparatus 10 performs processing from communication connection to the second communication apparatus 20 to communication disconnection according to the second embodiment. In the second embodiment, the first communication apparatus 10 determines a communication relationship based on the communication states of a plurality of HTTP communication operations (HTTP multi-session communication). That is, when the first communication apparatus 10 starts the second HTTP communication with the second communication apparatus 20 during the first HTTP communication with the second communication apparatus 20, it determines a communication relationship based on the communication state of the first HTTP communication.

In step M2301, the first communication apparatus 10 performs the first HTTP communication connection to the second communication apparatus 20. The detailed sequence of this communication connection processing is the same as that in steps M601 and M602 (the first HTTP communication connection and HTTP request transmission/response reception) of FIG. 4 shown in the first embodiment.

In step M2302, the first communication apparatus 10 selects an HTTP header table to be used for the second HTTP communication with the second communication apparatus 20. The detailed sequence of this table selection processing is the same as that shown in FIG. 8A of the first embodiment. However, the communication relationship determination processing in step M1201 is performed based on the presence/absence of the first HTTP communication connection to the second communication apparatus 20. In step M2302, the first communication apparatus 10 determines the presence of a communication relationship with the second communication apparatus 20. Furthermore, the HTTP header table used for the first HTTP communication with the second communication apparatus 20 exists in the first communication apparatus 10.

In step M2303, the first communication apparatus 10 performs the second HTTP communication with the second communication apparatus 20 using the HTTP header table which has been selected in step M2302 and is used for the first HTTP communication. The detailed sequence of the HTTP communication processing is the same as that shown in FIG. 4, and a series of processes, that is, the second HTTP communication connection processing, HTTP request transmission/response reception processing, and second HTTP communication disconnection processing are performed.

In step M2304, in response to the second HTTP communication disconnection processing in step M2303, the first communication apparatus 10 determines whether to delete the HTTP header table used for the second HTTP communication with the second communication apparatus 20. The detailed sequence of this table deletion processing is the same as that shown in FIG. 9 of the first embodiment. In step M2304, it is determined that the first HTTP communication is in progress (no HTTP communication disconnection has been performed) and the communication relationship with the second communication apparatus 20 is present, thereby storing the HTTP header table used with the second communication apparatus 20. Also, the second communication apparatus 20 determines the presence of the communication relationship with the first communication apparatus 10, and stores the HTTP header table used with the first communication apparatus 10.

In step M2305, the first communication apparatus 10 performs the first HTTP communication disconnection from the second communication apparatus 20. The detailed sequence of this communication disconnection processing is the same as that in step M603 (first HTTP communication disconnection) of FIG. 4.

In step M2306, in response to the first HTTP communication disconnection in step M2305, the first communication apparatus 10 determines to delete the HTTP header table used for the second HTTP communication with the second communication apparatus 20. The sequence of this table deletion processing is the same as that shown in FIG. 9. In step M2306, the first communication apparatus 10 determines the absence of the communication relationship with the second communication apparatus 20, and deletes the HTTP header table used for the first HTTP communication and second HTTP communication with the second communication apparatus 20. Also, the second communication apparatus 20 determines the absence of the communication relationship with the first communication apparatus 10, and deletes the HTTP header table used for the first HTTP communication and second HTTP communication with the first communication apparatus 10.

Communication Relationship Determination Processing

Figure 18A:
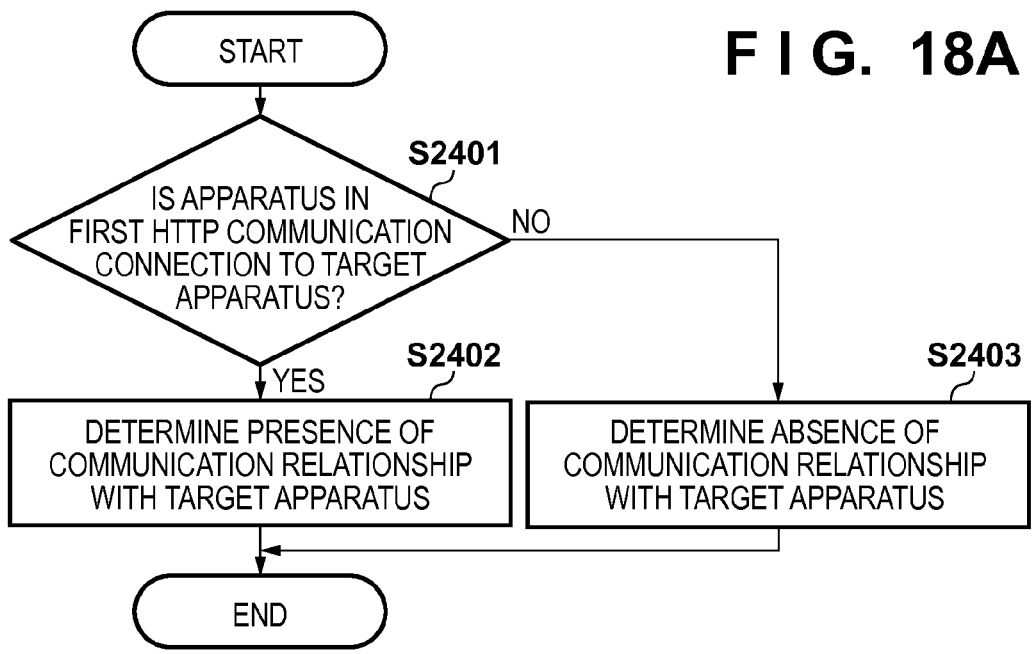
FIG. 18A is a flowchart illustrating the operation procedure of communication relationship determination processing by the first communication apparatus according to the second embodiment.

FIG. 18A is a flowchart illustrating processing of determining the presence/absence of the communication relationship with the second communication apparatus 20 by the first communication apparatus 10 according to the second embodiment.

In step S2401, a communication state determination unit 312 determines whether the apparatus is in the first HTTP communication connection to a target apparatus. If the apparatus is in the first HTTP communication connection to the target apparatus (S2401; YES), the process advances to step S2402; otherwise (S2401; NO), the process advances to step S2403.

After that, a communication relationship determination unit 311 determines the presence of the communication relationship with the target apparatus in step S2402, and determines the absence of the communication relationship in step S2403, similarly to FIG. 11.

Communication Event Detection Processing

Figure 18B:
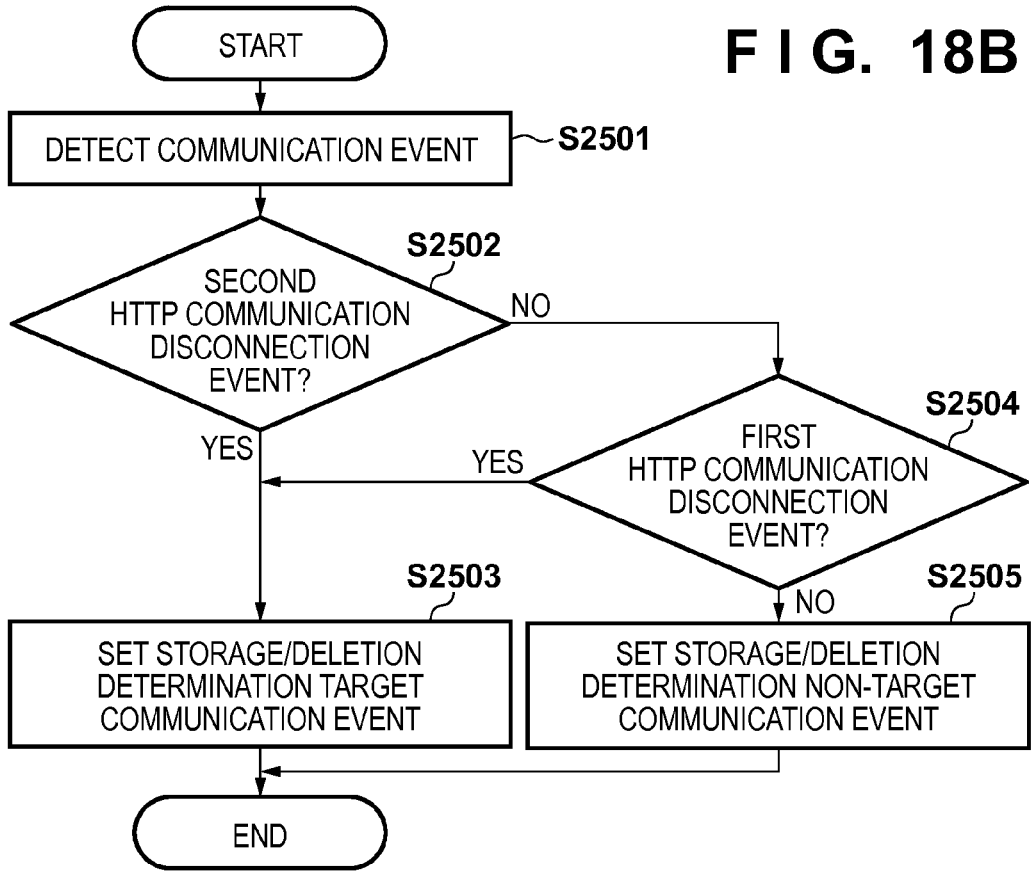
FIG. 18B is a flowchart illustrating the operation procedure of communication event detection processing by the first communication apparatus according to the second embodiment.

FIG. 18B is a flowchart illustrating processing of detecting, by the first communication apparatus 10, a communication event for determining to store or delete the HTTP header table used with the second communication apparatus 20 according to the second embodiment.

In step S2501, a communication event is detected, similarly to step S2201 of FIG. 16.

In step S2502, the communication relationship determination unit 311 determines whether the detected communication event is an event of the second HTTP communication disconnection from the target apparatus. If the detected communication event is a second HTTP communication disconnection event (S2502; YES), the process advances to step S2503; otherwise (S2502; NO), the process advances to step S2504. In step S2503, the detected communication event is set as a storage/deletion determination target communication event, similarly to step S2203 of FIG. 16.

In step S2504, the communication relationship determination unit 311 determines whether the detected communication event is an event of the first HTTP communication disconnection from the target apparatus. If the detected communication event is a first HTTP communication disconnection event (S2504; YES), the process advances to step S2503; otherwise (S2504; NO), the process advances to step S2505. In step S2505, the detected communication event is set as a storage/deletion determination non-target communication event, similarly to step S2205 of FIG. 16.

As described above, according to the second embodiment, the first communication apparatus 10 selects the HTTP header table used for the first HTTP communication as an HTTP header table to be used for the second HTTP communication with the second communication apparatus 20. Thus, the first communication apparatus 10 need not newly create an HTTP header table every time a plurality of HTTP communication operations with the second communication apparatus 20 start, thereby reducing the processing load of HTTP header table creation processing and a communication delay caused by the creation time.

Third Embodiment

The third embodiment of the present invention will be described below. According to a feature of the third embodiment, a communication relationship is determined based on a communication state associated with a network joining/leaving operation on a wireless LAN. As for a communication system configuration and function module arrangement according to the third embodiment, a description of the same elements as those in the above-described first or second embodiment will be omitted.

System Configuration

Figure 19A:
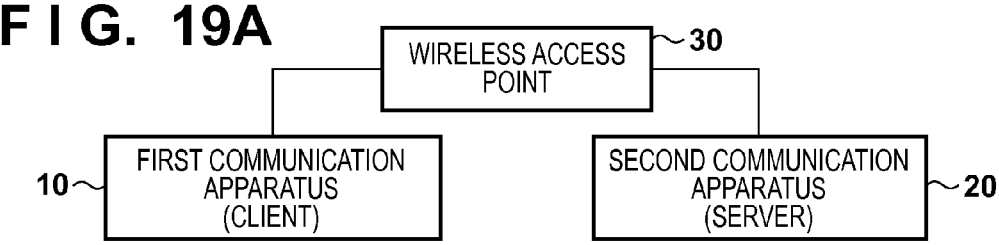
FIG. 19A is a block diagram showing the configuration of a communication system according to the third embodiment.

FIG. 19A is a block diagram showing an example of the configuration of a communication system according to the third embodiment. A first communication apparatus 10 and a second communication apparatus 20 are the same as in the first embodiment.

A wireless access point 30 relays wireless LAN communication between the first communication apparatus 10 and the second communication apparatus 20. Note that the third embodiment will exemplify a case in which the wireless access point 30 is used by the first communication apparatus 10 and second communication apparatus 20 to perform wireless LAN communication. However, a wireless LAN router or the like may be used. If the first communication apparatus 10 and second communication apparatus 20 perform wired LAN communication, a wired LAN hub, wired LAN switch, wired LAN router, or the like may be used instead of the wireless access point 30.

Communication Sequence (Network Joining/Leaving)

A sequence showing message examples when the first communication apparatus 10 according to the third embodiment performs processing from communication connection to the second communication apparatus 20 to communication disconnection is the same as that shown in FIG. 3. In the third embodiment, the first communication apparatus 10 determines a communication relationship based on a communication state associated with a network joining/leaving operation on the wireless LAN.

Figure 19B:
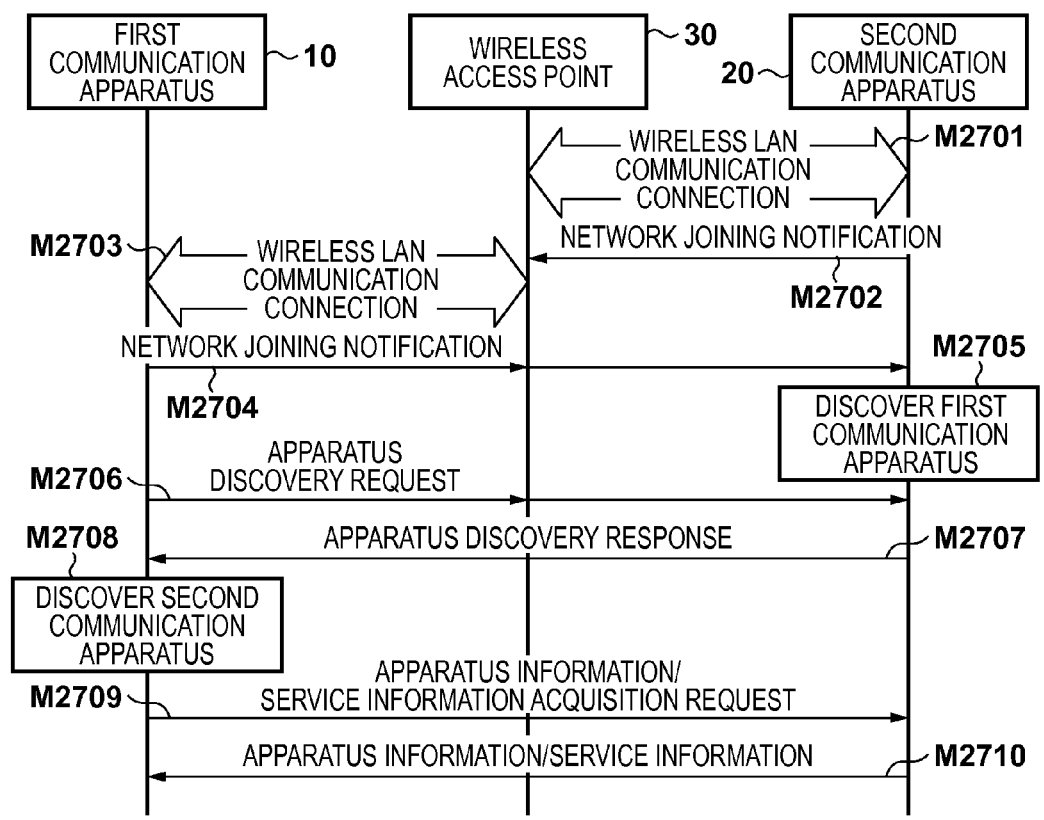
FIGS. 19B and 19C are sequence charts respectively showing message examples when a first communication apparatus joins and leaves a network according to the third embodiment.

FIG. 19B is a sequence chart showing message examples when the first communication apparatus 10 of the third embodiment joins a network on the wireless LAN.

In step M2701, the second communication apparatus 20 performs wireless LAN communication connection to the wireless access point 30. In step M2702, the second communication apparatus 20 notifies the wireless LAN that it joins a network. In the third embodiment, an SSDP:alive message is transmitted as a network joining notification.

In step M2703, the first communication apparatus 10 performs wireless LAN communication connection to the wireless access point 30. In step M2704, the first communication apparatus 10 notifies the wireless LAN that it joins a network. Then, in step M2705, the second communication apparatus 20 receives the network joining notification from the first communication apparatus 10, and discovers the first communication apparatus 10.

In step M2706, the first communication apparatus 10 transmits an apparatus discovery request to the wireless LAN. In the third embodiment, an SSDP:M-SEARCH message is transmitted as the apparatus discovery request. Then, in step M2707, in response to the apparatus discovery request received in step M2706, the second communication apparatus 20 transmits an apparatus discovery response. In the third embodiment, a response message to the SSDP:M-SEARCH message is transmitted as the apparatus discovery response. In step M2708, the first communication apparatus 10 receives the apparatus discovery response from the second communication apparatus 20, and discovers the second communication apparatus 20.

In step M2709, the first communication apparatus 10 requests the second communication apparatus 20 to acquire apparatus information and service information. The apparatus information and service information indicate a device description and service description in UPnP, respectively. In step M2710, in response to the request, from the first communication apparatus 10, to acquire the apparatus information and service information, the second communication apparatus 20 transmits the apparatus information and service information about itself.

Figure 19C:
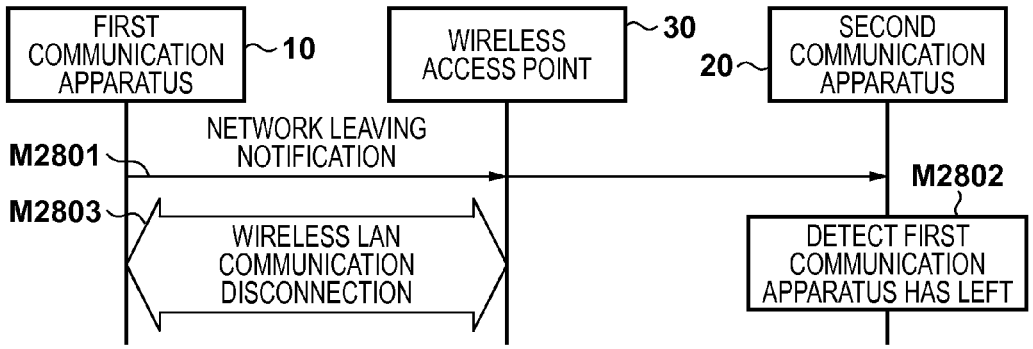

FIG. 19C is a sequence chart showing message examples when the first communication apparatus 10 leaves the network on the wireless LAN according to the third embodiment.

In step M2801, the first communication apparatus 10 notifies the wireless LAN that it leaves the network. In the third embodiment, an SSDP:byebye message is transmitted as a network leaving notification. Then, in step M2802, the second communication apparatus 20 receives the network leaving notification from the first communication apparatus 10, and detects that the first communication apparatus 10 has left the network. In step M2803, the first communication apparatus 10 performs wireless LAN communication disconnection from the wireless access point 30.

Communication Relationship Determination Processing

Figure 20A:
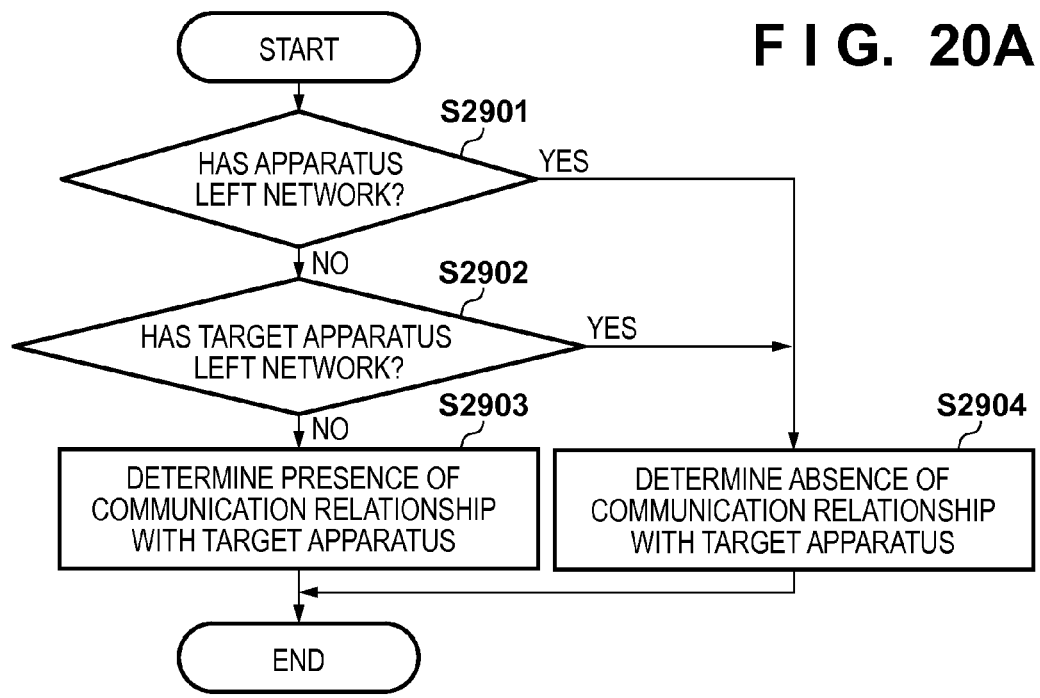
FIG. 20A is a flowchart illustrating the operation procedure of communication relationship determination processing by the first communication apparatus according to the third embodiment.

FIG. 20A is a flowchart illustrating processing of determining the presence/absence of the communication relationship with the second communication apparatus 20 by the first communication apparatus 10 according to the third embodiment.

In step S2901, by using a discovery controller 308, a communication state determination unit 312 determines whether the first communication apparatus 10 has left the network. If the first communication apparatus 10 has left the network (S2901; YES), the process advances to step S2904; otherwise (S2901; NO), the process advances to step S2902.

In step S2902, by using the discovery controller 308, the communication state determination unit 312 determines whether the target apparatus has left the network. If the target apparatus has left the network (S2902; YES), the process advances to step S2904; otherwise (S2902; NO), the process advances to step S2903.

After that, a communication relationship determination unit 311 determines the presence of the communication relationship with the target apparatus in step S2903, and determines the absence of the communication relationship in step S2904, similarly to FIG. 11.

Communication Event Detection Processing

Figure 20B:
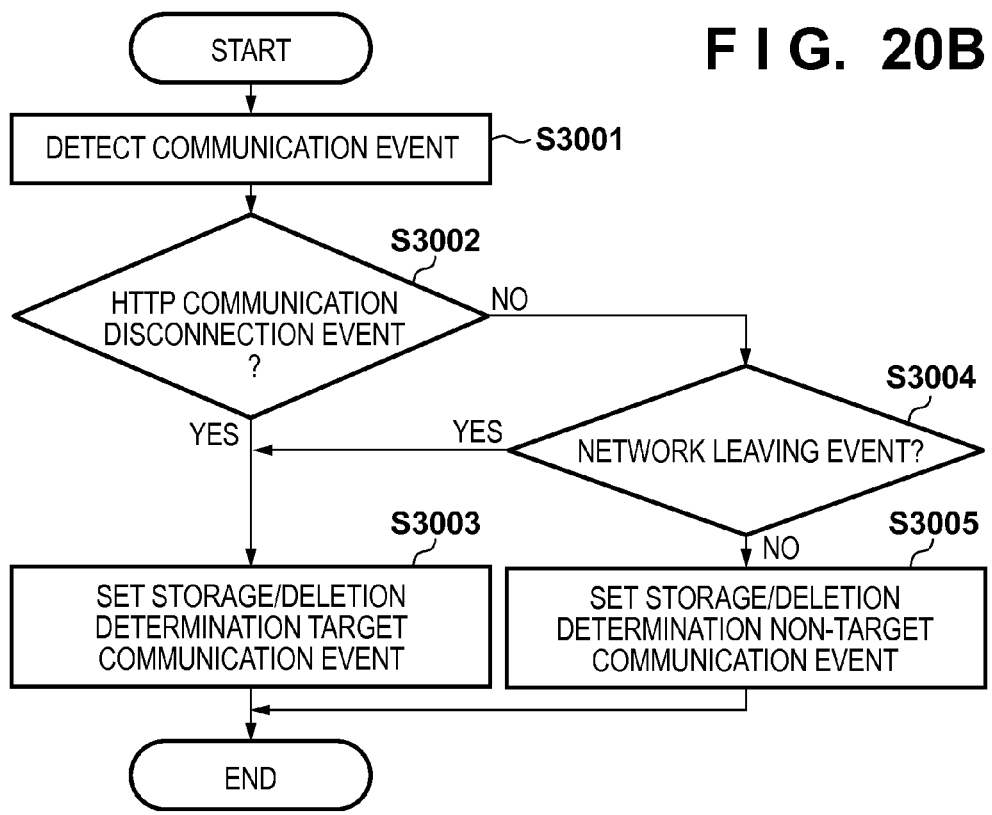
FIG. 20B is a flowchart illustrating the operation procedure of communication event detection processing by the first communication apparatus according to the third embodiment.

FIG. 20B is a flowchart illustrating processing of detecting, by the first communication apparatus 10, a communication event for determining to store or delete an HTTP header table used with the second communication apparatus 20 according to the third embodiment.

In step S3001, a communication event is detected, similarly to step S2201 of FIG. 16.

In step S3002, the communication relationship determination unit 311 determines whether the detected communication event is an event of HTTP communication disconnection from the target apparatus. If the detected communication event is an HTTP communication disconnection event (S3002; YES), the process advances to step S3003; otherwise (S3002; NO), the process advances to step S3004. In step S3003, an HTTP header table selection unit 320 sets the detected communication event as a storage/deletion determination target communication event.

In step S3004, the communication relationship determination unit 311 determines whether the detected communication event is a network leaving event. If the detected communication event is a network leaving event (S3004; YES), the process advances to step S3003; otherwise (S3004; NO), the process advances to step S3005. In step S3005, the HTTP header table selection unit 320 sets the detected communication event as a storage/deletion determination non-target communication event.

As described above, according to the third embodiment, the first communication apparatus 10 appropriately selects an HTTP header table to be used for HTTP communication with the second communication apparatus 20 in accordance with the communication relationship associated with a network joining/leaving operation on the wireless LAN. Therefore, the first communication apparatus 10 need not newly create an HTTP header table every time HTTP communication with the second communication apparatus 20 starts, and can reuse the HTTP header table while it exists on the same network. This reduces the processing load of HTTP header table creation processing and a communication delay caused by the creation time.

Note that the third embodiment has exemplified a case in which the communication relationship determination unit 311 detects a network leaving event using the discovery controller 308, as shown in step S3004 of FIG. 20B. The present invention, however, is not limited to this. For example, if power-off, wireless LAN communication disconnection, or the like occurs while the first communication apparatus 10 or second communication apparatus 20 joins the network on the wireless LAN, it may be impossible to detect a network leaving communication event. To the contrary, the communication relationship determination unit 311 may detect a network joining event using the discovery controller 308. This can reduce unnecessary consumption of the memory area by surely deleting an HTTP header table which should be deleted, thereby further reducing the processing load of the HTTP header table selection unit 320 and a communication delay caused by selection processing.

Furthermore, the first communication apparatus 10 according to the third embodiment may perform confirmation and notification of the HTTP header table selected with the second communication apparatus 20 during a network joining or leaving sequence or apparatus discovery sequence. This can reduce the sequence shown in FIG. 8B between the first communication apparatus 10 and the second communication apparatus 20, thereby increasing the communication speed between the first communication apparatus 10 and the second communication apparatus 20, and reducing the power consumption.

Fourth Embodiment

The fourth embodiment of the present invention will be described below. According to a feature of the fourth embodiment, a communication relationship is determined based on a communication history. As for a communication system configuration and function module arrangement according to the fourth embodiment, a description of the same elements as those in the above-described first to third embodiments will be omitted.

A sequence showing message examples when a first communication apparatus 10 performs processing from communication connection to a second communication apparatus 20 to communication disconnection according to the fourth embodiment is the same as that shown in FIG. 3. In the fourth embodiment, the first communication apparatus 10 determines a communication relationship based on a communication history with the second communication apparatus 20.

Communication Relationship Determination Processing

Figure 21:
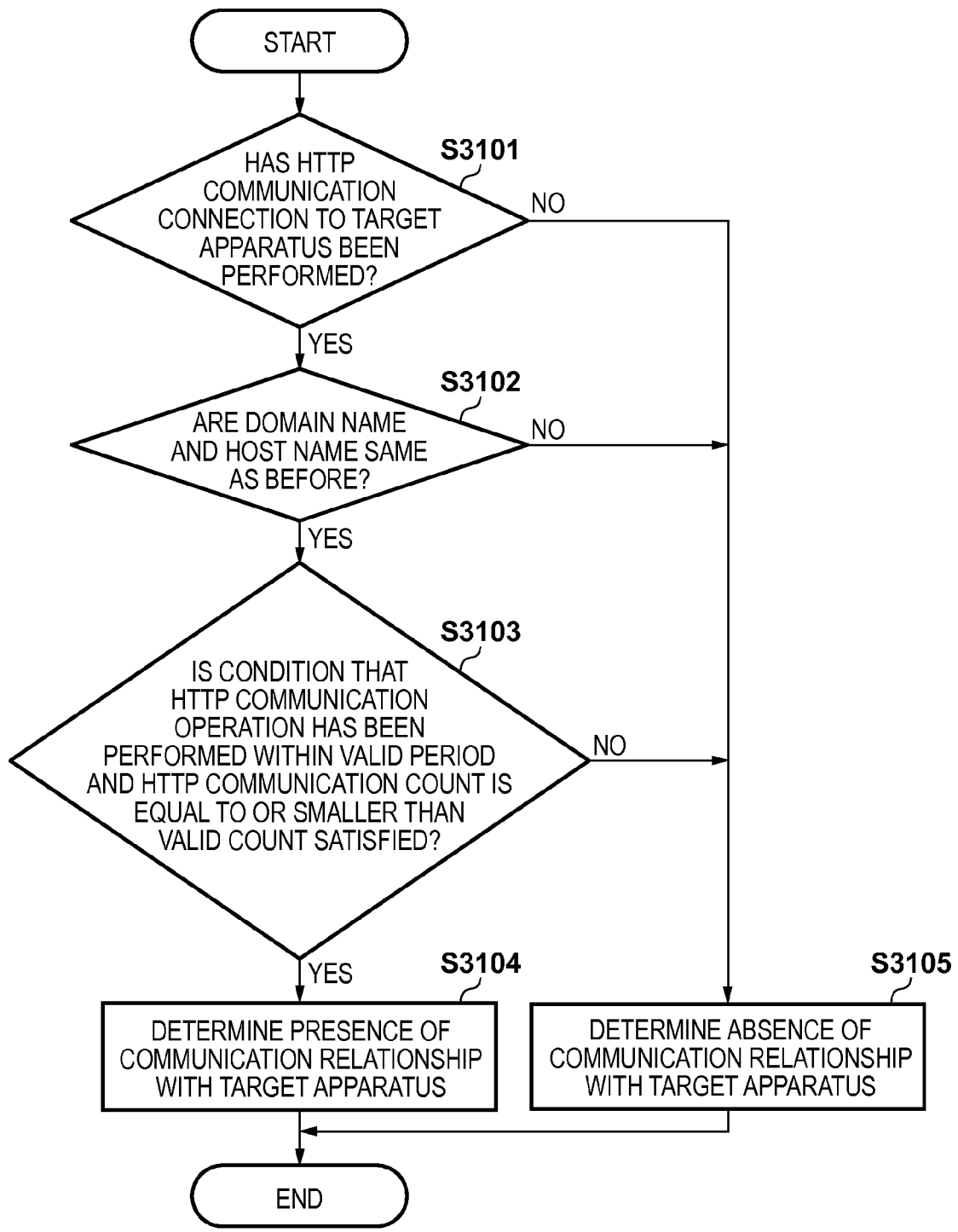
FIG. 21 is a flowchart illustrating the operation procedure of communication relationship determination processing by a first communication apparatus according to the fourth embodiment.

FIG. 21 is a flowchart illustrating processing of determining the presence/absence of a communication relationship with the second communication apparatus 20 by the first communication apparatus 10 according to the fourth embodiment.

In step S3101, a communication history determination unit 313 performs determination processing based on an HTTP communication history with a target apparatus. If there is a communication history with the target apparatus (S3101; YES), the process advances to step S3102; otherwise (S3101; NO), the process advances to step S3105.

In step S3102, the communication history determination unit 313 performs determination processing based on a TCP/IP communication history with the target apparatus. That is, the communication history determination unit 313 determines whether the domain name and host name of the target apparatus are the same as before. If the domain name and host name are the same as before (S3102; YES), the process advances to step S3103; otherwise (S3102; NO), the process advances to step S3105.

In step S3103, the communication history determination unit 313 performs determination processing based on the HTTP communication history with the target apparatus. In this example, if the communication history determination unit 313 determines that the previous HTTP communication operation with the target apparatus has been performed within a valid period and an HTTP communication count is equal to or smaller than a valid count (S3103; YES), the process advances to step S3104; otherwise (S3103; NO), the process advances to step S3105.

After that, a communication relationship determination unit 311 determines the presence of the communication relationship with the target apparatus in step S3104, and determines the absence of the communication relationship in step S3105, similarly to FIG. 11.

As described above, according to the fourth embodiment, the first communication apparatus 10 appropriately selects an HTTP header table to be used for HTTP communication with the second communication apparatus 20 in accordance with the communication history with the second communication apparatus 20. Therefore, the first communication apparatus 10 need not newly create an HTTP header table every time HTTP communication with the second communication apparatus 20 starts, and can reuse the HTTP header table while it exists on the same network. This reduces the processing load of HTTP header table creation processing and a communication delay caused by the creation time.

Furthermore, the fourth embodiment has exemplified a case in which the communication history determination unit 313 determines the presence/absence of the communication relationship based on the HTTP communication history and TCP/IP communication history. The present invention, however, is not limited to this. For example, the communication history determination unit 313 may determine the presence/absence of the communication relationship based a wireless LAN communication history with the second communication apparatus 20. For example, when there is a wireless LAN connection history or a history of a specific wireless LAN connection mode (for example, persistent group connection of Wi-Fi Direct®), the presence of the communication relationship is determined. Alternatively, the determination processing may be performed based on a discovery history with the second communication apparatus 20. For example, when there is a joining/discovery history in a network on a wireless LAN, and the joining/discovery date/time and count fall within valid ranges, the presence of the communication relationship is determined. Also, the determination processing may be performed based on an authentication history with the second communication apparatus 20. For example, when there is a history of user login success, authentication success, or the like, the presence of the communication relationship is determined. The determination processing may be performed based on a service provision/use history with the second communication apparatus 20. For example, if services of the same types/contents are provided/used, the presence of the communication relationship is determined.

Fifth Embodiment

The fifth embodiment of the present invention will be described below. According to a feature of the fifth embodiment, a communication relationship is determined based on a communication method. As for a communication system configuration and function module arrangement according to the fifth embodiment, a description of the same elements as those in the above-described first to fourth embodiments will be omitted.

A sequence showing message examples when a first communication apparatus 10 performs processing from communication connection to a second communication apparatus 20 to communication disconnection according to the fifth embodiment is the same as that shown in FIG. 3. In the fifth embodiment, the first communication apparatus 10 determines the communication relationship based on a communication method with the second communication apparatus 20.

HTTP Header Table Selection Processing

Figure 22:
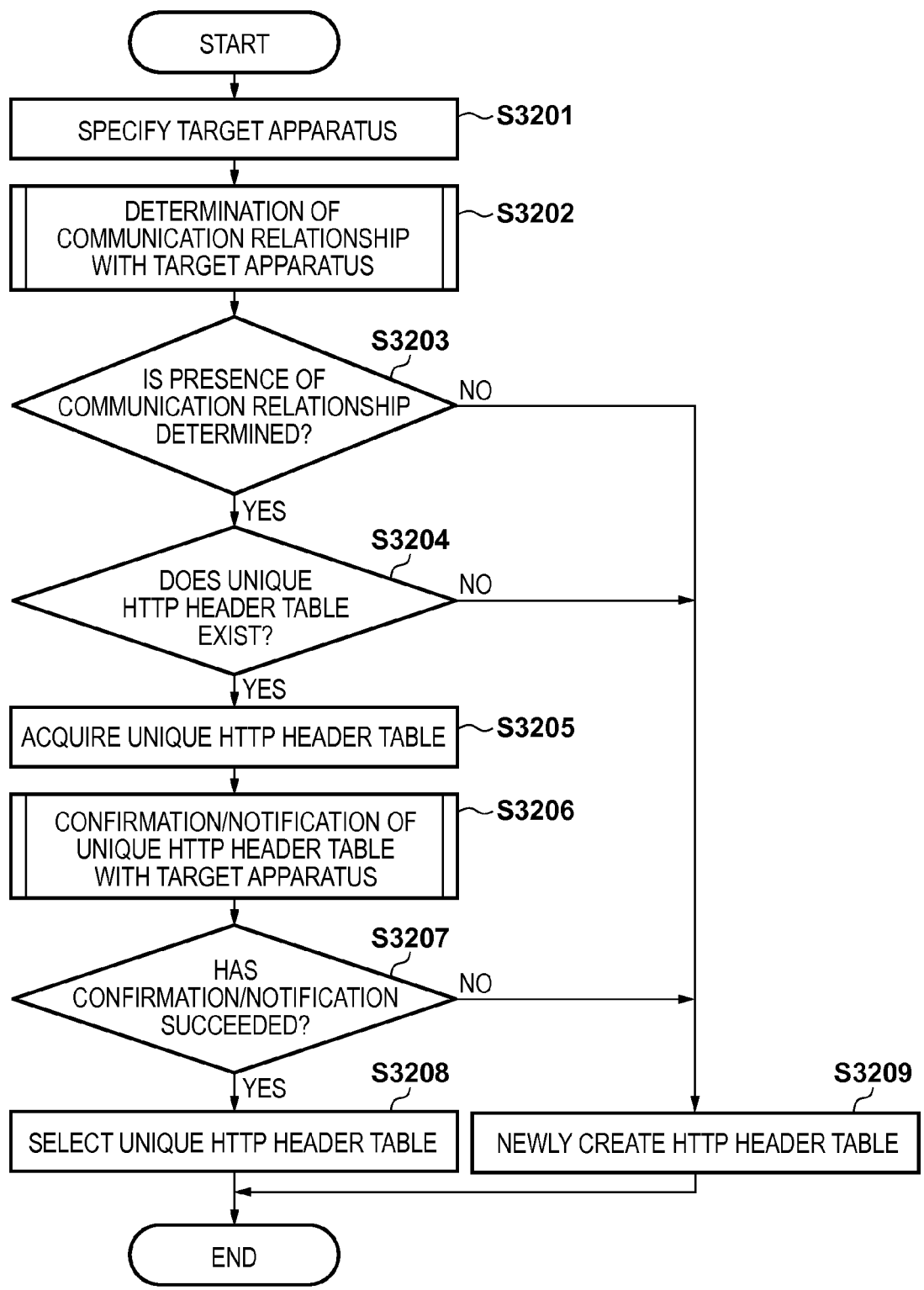
FIG. 22 is a flowchart illustrating the operation procedure of HTTP header table selection processing by a first communication apparatus according to the fifth embodiment.

FIG. 22 is a flowchart illustrating an operation procedure of selecting, by the first communication apparatus 10, an HTTP header table with the second communication apparatus 20.

In step S3201, an HTTP header table selection unit 320 specifies a target apparatus (the second communication apparatus 20 in this example) using an HTTP communication controller 307. In step S3202, a communication relationship determination unit 311 determines the presence/absence of a communication relationship with the target apparatus. Details of this determination processing will be described later with reference to FIG. 23.

If the presence of the communication relationship with the target apparatus is determined (S3203; YES), the process advances to step S3204; otherwise (S3203; NO), the process advances to step S3209.

In step S1504, the HTTP header table selection unit 320 determines whether there is an HTTP header table for the communication relationship with the target apparatus in an HTTP header table storage unit 318. If there exists the HTTP header table (S1504; YES), the process advances to step S1505; otherwise (S1504; NO), the process advances to step S1509.

In step S3204, by using a unique HTTP header table management unit 324, the HTTP header table selection unit 320 determines whether there is a unique HTTP header table corresponding to a predetermined communication method for the communication relationship with the target apparatus. If there exists the unique HTTP header table (S3204; YES), the process advances to step S3205; otherwise (S3204; NO), the process advances to step S3209.

In step S3205, the HTTP header table selection unit 320 acquires the unique HTTP header table corresponding to the predetermined communication method for the communication relationship with the target apparatus by using the unique HTTP header table management unit 324. In step S3206, an HTTP header table confirmation unit 321 performs, with the target apparatus, confirmation and notification of the unique HTTP header table acquired in step S3205. Details of this HTTP header table confirmation/notification processing are the same as in the first embodiment described with reference to FIG. 12.

If the confirmation and notification processing in step S3206 has succeeded (S3207; YES), the process advances to step S3208; otherwise (S3207; NO), the process advances to step S3209.

In step S3208, the HTTP header table selection unit 320 selects the unique HTTP header table acquired in step S3205 to be used by an HTTP header compression unit 315 for HTTP header compression with the target apparatus, thereby terminating the process.

In step S3209, an HTTP header table generation unit 316 newly generates an initial HTTP header table defined by the HTTP/2 method. Then, the HTTP header table selection unit 320 selects the newly generated HTTP header table to be used by the HTTP header compression unit 315 for HTTP header compression with the target apparatus, thereby terminating the process.

Communication Relationship Determination Processing (S3202)

Figure 23:
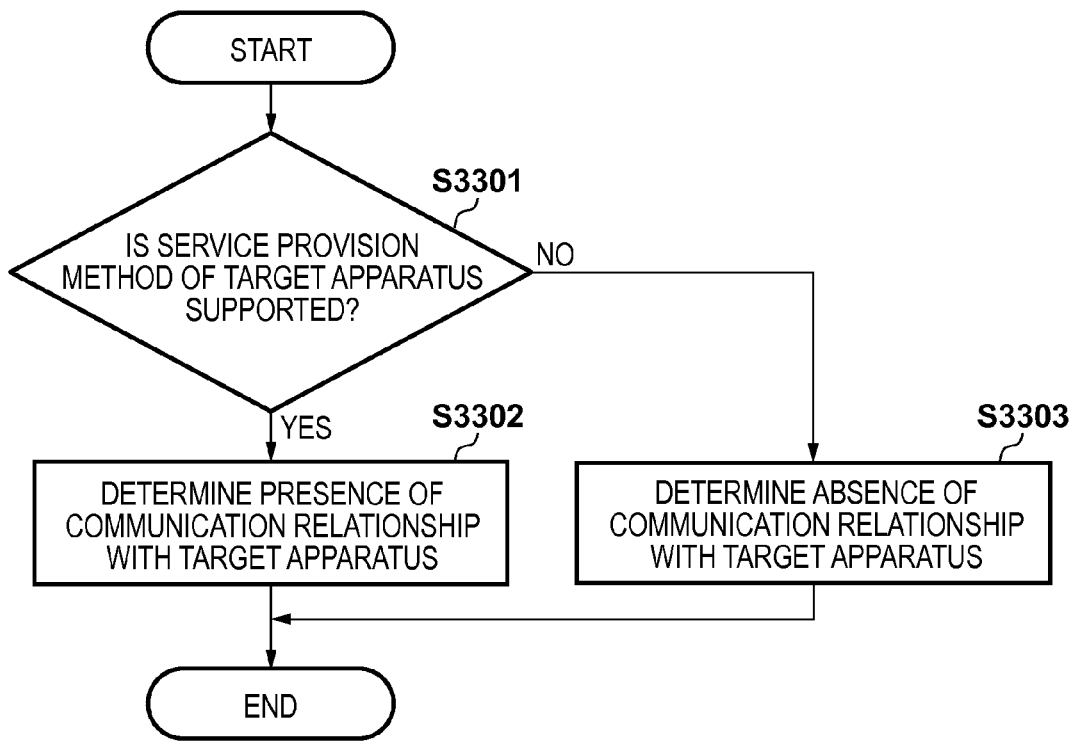
FIG. 23 is a flowchart illustrating the operation procedure of communication relationship determination processing by the first communication apparatus according to the fifth embodiment.

FIG. 23 is a flowchart illustrating processing of determining the presence/absence of the communication relationship with the second communication apparatus 20 by the first communication apparatus 10 according to the fifth embodiment, and shows details of step S3202 described above.

In step S3301, a communication method determination unit 314 determines the communication relationship based on the service provision method of the target apparatus using a service controller 310. That is, if the service controller 310 can support the service provision method of the target apparatus (S3301; YES), the process advances to step S3302; otherwise (S3301; NO), the process advances to step S3303.

In step S3302, the communication relationship determination unit 311 receives the determination result of the communication method determination unit 314, and determines the presence of the communication relationship with the target apparatus, thereby terminating the process. On the other hand, in step S3303, the communication relationship determination unit 311 receives the determination result of the communication method determination unit 314, and determines the absence of the communication relationship with the target apparatus, thereby terminating the process.

Unique HTTP Header Table

FIG. 25 is a table showing a practical example of the unique HTTP header table according to the fifth embodiment, and shows an example of the unique HTTP header table complying with DLNA® as a communication method. Referring to FIG. 25, in addition to initial records of indices 3611 "0" to "37", records of indices "38" to "42" are added to an HTTP request header table 3610. These added records are HTTP request headers commonly used or defined in DLNA®.

Similarly, in addition to initial records of indices 3621 "0" to "34", records of indices "35" to "37" are added to an HTTP response header table 3620. These added records are HTTP response headers commonly used or defined in DLNA®.

As described above, according to the fifth embodiment, the first communication apparatus 10 selects the unique HTTP header table complying with the predetermined communication method with the second communication apparatus 20 as an HTTP header table to be used for HTTP communication with the second communication apparatus 20. Thus, the first communication apparatus 10 need not newly create an HTTP header table every time HTTP communication with the second communication apparatus 20 starts, and can use the unique HTTP header table optimized for the predetermined communication method. This can further reduce the processing load of HTTP header table creation processing and a communication delay caused by the creation time.

The fifth embodiment has exemplified a case in which the communication method determination unit 314 determines the presence/absence of the communication relationship based on the service provision method of the target apparatus by using the service controller 310. The present invention, however, is not limited to this. For example, the presence/absence of the communication relationship may be determined based on a wireless LAN communication method with the second communication apparatus 20. In this case, when the wireless LAN communication method is the wireless direct method, Wi-Fi Direct® method, Wi-Fi Direct® Service method, Wi-Fi Miracast® method, or the like, the communication method determination unit 314 determines the presence of the communication relationship. Also, the presence/absence of the communication relationship may be determined based on a TCP/IP communication method with the second communication apparatus 20. When the TCP/IP communication method is the VPN method, IPsec method, or the like, the presence of the communication relationship is determined. Furthermore, the presence/absence of the communication relationship may be determined based on a discovery method with the second communication apparatus 20. If the discovery method is the SSDP method, mDNS method, Bonjour® method, SDP method, or the like, the presence of the communication relationship is determined. The determination processing may be performed based on an authentication method. When the authentication method is the HTTP authentication (Basic authentication and Digest authentication) method, OAuth 2.0 method, OpenID® method, OpenID® Connect method, SAML method, or the like, the presence of the communication relationship is determined.

The fifth embodiment has exemplified a case in which the HTTP header table selection unit 320 selects one unique HTTP header table corresponding to the predetermined communication method with the second communication apparatus 20. The present invention, however, is not limited to this. For example, when the first communication apparatus 10 performs HTTP communication with the second communication apparatus 20 based on a plurality of predetermined communication methods, a plurality of unique HTTP header tables corresponding to the communication methods may be selected and used in combination. This allows the use of HTTP header tables optimized for various communication methods, thereby further reducing the processing load of HTTP header table creation processing and a communication delay caused by the creation time. With the arrangement according to this embodiment, it is possible to reuse a table by selecting a table to be referred to by the message head compression function in accordance with the connection status between communication apparatuses, thereby reducing processing of newly creating a table.

Other Embodiments

Each of the above-described embodiments can be implemented by combining some of them.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-142637, filed Jul. 10, 2014 which is hereby incorporated by reference herein in its entirety.

What is claimed is:

1. A communication apparatus comprising:
a generation unit configured to generate a first header compression table for compressing a header portion of a message to be communicated based on a first communication connection established with another communication apparatus;
a transmission unit configured to transmit, to the other communication apparatus based on the first communication connection established with the other communication apparatus, the message whose header portion has been compressed based on the first header compression table generated by the generation unit;
a determination unit configured to determine whether the first header compression table is used as a second header compression table for compressing a header portion of a message to be communicated based on a second communication connection which is different from the first communication connection and has been established with the other communication apparatus; and
a compression unit configured to compress the header portion of the message to be communicated based on the second communication connection using the first header compression table corresponding to the first communication connection as the second header compression table corresponding to the second communication connection in accordance with determination by the determination unit,
wherein at least one of the generation unit, the transmission unit, the determination unit, or the compression unit is implemented using a processor.

2. The communication apparatus according to claim 1, wherein in a case where the determination unit determines not to use the first header compression table as the second header compression table, the generation unit generates a new header compression table based on contents of the header portion of the message to be communicated after the second communication connection is established.

3. The communication apparatus according to claim 1, further comprising a disconnection unit configured to execute disconnection processing for disconnecting the first communication connection established with the other communication apparatus,
wherein based on a parameter of the communication apparatus at a timing of execution of the disconnection processing, the determination unit determines whether to use the first header compression table as the second header compression table.

4. The communication apparatus according to claim 1, wherein the determination unit acquires history information indicating a communication history between the communication apparatus and the other communication apparatus, and determines whether to use the first header compression table as the second header compression table using the acquired history information.

5. The communication apparatus according to claim 1, further comprising a notification unit configured to, in a case where the determination unit determines to use the first header compression table as the second header compression table, notify the other communication apparatus of the determination.

6. The communication apparatus according to claim 1, wherein if the first communication connection to the other communication apparatus has not been disconnected in a case where the second communication connection to the other communication apparatus is established, the determination unit determines to use the first header compression table as the second header compression table, and
if the first communication connection to the other communication apparatus has been disconnected in the case where the second communication connection to the other communication apparatus is established, the determination unit determines not to use the first header compression table as the second header compression table.

7. The communication apparatus according to claim 1, wherein the first and second communication connections are connections by Hyper Text Transfer Protocol (HTTP), and the compression unit compress at least one of a header field of an HTTP request or a header field of an HTTP response.

8. The communication apparatus according to claim 3, wherein the determination unit acquires, as the parameter of the communication apparatus at the timing of execution of the disconnection processing, connection information indicating whether a wireless local area network connection to the other communication apparatus continues, in a case where the acquired connection information indicates that the wireless local area network connection continues, the determination unit determines to use the first header compression table as the second header compression table, and in another case where the acquired connection information indicates that the wireless local area network connection does not continue, the determination unit determines not to use the first header compression table as the second header compression table.

9. The communication apparatus according to claim 3, wherein the determination unit acquires, as the parameter of the communication apparatus at the timing of execution of the disconnection processing, authentication information indicating whether an authentication state with the other communication apparatus continues, in a case where the acquired authentication information indicates that the authentication state continues, the determination unit determines to use the first header compression table as the second header compression table; and in another case where the acquired authentication information indicates that the authentication state does not continue, the determination unit determines not to use the first header compression table as the second header compression table.

10. The communication apparatus according to claim 3, wherein the determination unit acquires, as the parameter of the communication apparatus at the timing of execution of the disconnection processing, service use information indicating whether a service use state between the communication apparatus and the other communication apparatus continues, in a case where the acquired service use information indicates that the service use state continues, the determination unit determines to use the first header compression table as the second header compression table; and in another case where the acquired service use information indicates that the service use state does not continue, the determination unit determines not to use the first header compression table as the second header compression table.

11. A communication method comprising:
using a processor to perform steps of:
generating a first header compression table for compressing a header portion of a message to be communicated based on a first communication connection established between communication apparatuses;

transmitting, from a communication apparatus to another communication apparatus based on the first communication connection established between the communication apparatuses, the message whose header portion has been compressed based on the first header compression table generated in the generating step;

determining whether the first header compression table is used as a second header compression table for compressing a header portion of a message to be communicated based on a second communication connection which is different from the first communication connection and has been established between the communication apparatuses; and compressing the header portion of the message to be communicated based on the second communication connection using the first header compression table corresponding to the first communication connection as the second header compression table corresponding to the second communication connection in accordance with determination in the determining step.

12. The communication method according to claim 11, further comprising a step of generating, in a case where it is determined that the first header compression table is not use as the second header compression table in the determining step, a new header compression table based on contents of the header portion of the message to be communicated after the second communication connection is established.

13. The communication method according to claim 11, further comprising steps of:

executing disconnection processing for disconnecting the first communication connection established between the communication apparatuses; and determining, based on a parameter of the communication apparatus at a timing of execution of the disconnection processing, whether to use the first header compression table as the second header compression table.

14. A non-transitory computer-readable medium storing a computer-executable program for causing a computer to perform a communication method, the method comprising steps of:

generating a first header compression table for compressing a header portion of a message to be communicated based on a first communication connection established between communication apparatuses;

transmitting, from a communication apparatus to another communication apparatus based on the first communication connection established between the communication apparatuses, the message whose header portion has been compressed based on the first header compression table generated in the generating step;

determining whether the first header compression table is used as a second header compression table for compressing a header portion of a message to be communicated based on a second communication connection which is different from the first communication connection and has been established between the communication apparatuses; and compressing the header portion of the message to be communicated based on the second communication connection using the first header compression table corresponding to the first communication connection as the second header compression table corresponding to the second communication connection in accordance with determination in the determining step.

15. The medium according to claim 14, wherein the method further comprises a step of generating, in a case where it is determined that the first header compression table is not use as the second header compression table in the determining step, a new header compression table based on contents of the header portion of the message to be communicated after the second communication connection is established.

16. The medium according to claim 14, wherein the method further comprises steps of:
  executing disconnection processing for disconnecting the first communication connection established between the communication apparatuses; and
  determining, based on a parameter of the communication apparatus at a timing of execution of the disconnection processing, whether to use the first header compression table as the second header compression table.

* * * * *